United States Patent
Mästle et al.

(10) Patent No.: US 12,146,733 B2
(45) Date of Patent: Nov. 19, 2024

(54) MEASURING DEVICE AND METHOD OF OPERATING A MEASURING DEVICE

(71) Applicant: HELMUT FISCHER GMBH INSTITUT FÜR ELEKTRONIK UND MESSTECHNIK, Sindelfingen (DE)

(72) Inventors: Rüdiger Mästle, Böblingen (DE); Lars-Christian Anklamm, Berlin (DE)

(73) Assignee: HELMUT FISCHER GMBH INSTITUT FÜR ELEKTRONIK UND MESSTECHNIK, Sindelfingen (DE)

( * ) Notice: Subject to any disclaimer, the term of this patent is extended or adjusted under 35 U.S.C. 154(b) by 453 days.

(21) Appl. No.: 17/426,597

(22) PCT Filed: May 25, 2020

(86) PCT No.: PCT/EP2020/064440
§ 371 (c)(1),
(2) Date: Jul. 28, 2021

(87) PCT Pub. No.: WO2020/239694
PCT Pub. Date: Dec. 3, 2020

(65) Prior Publication Data
US 2022/0091028 A1 Mar. 24, 2022

(30) Foreign Application Priority Data
May 24, 2019 (EP) ..................................... 19176500

(51) Int. Cl.
*G01B 11/06* (2006.01)
*G01B 11/02* (2006.01)
(Continued)

(52) U.S. Cl.
CPC ........ *G01B 11/0625* (2013.01); *G01B 11/026* (2013.01); *G01B 21/045* (2013.01);
(Continued)

(58) Field of Classification Search
CPC ........... G01N 21/3586; G01N 21/3581; G01B 11/026; G01B 11/0616; G01B 11/0625; G01B 21/045; G01B 11/26
See application file for complete search history.

(56) References Cited

U.S. PATENT DOCUMENTS

| 2015/0212060 A1 | 7/2015 | Van Mechelen et al. |
| 2017/0050208 A1 | 2/2017 | Nichols et al. |

(Continued)

FOREIGN PATENT DOCUMENTS

| JP | 2015127699 A | 7/2015 |
| WO | 2005022130 A1 | 3/2005 |

(Continued)

OTHER PUBLICATIONS

PCT/EP2020/064440. Int'l Search Report & Written Opinion (Aug. 5, 2020).
(Continued)

*Primary Examiner* — Chih-Cheng Kao
(74) *Attorney, Agent, or Firm* — Jessica Smith; LOZA & LOZA, LLP

(57) ABSTRACT

A measuring device comprises a Terahertz, THz, transmitter configured to emit a THz signal to an object to be measured and a THz receiver configured to receive a reflected portion of said THz signal that has been reflected by said object. The said THz transmitter and said THz receiver are arranged in a measuring head of said measuring device. The measuring device may vary a distance between said measuring head and said object to be measured, emit, by means of said THz transmitter, said THz signal to said object to be measured,
(Continued)

receive said reflected portion of said THz signal, and determine a first parameter characterizing a detected signal proportional and/or related to said received reflected portion of said THz signal.

18 Claims, 4 Drawing Sheets

(51) Int. Cl.
    *G01B 21/04*     (2006.01)
    *G01N 21/3581*     (2014.01)
    *G01N 21/3586*     (2014.01)
    *G01B 11/26*     (2006.01)

(52) U.S. Cl.
    CPC ..... *G01N 21/3581* (2013.01); *G01N 21/3586* (2013.01); *G01B 11/0616* (2013.01); *G01B 11/26* (2013.01)

(56) References Cited

U.S. PATENT DOCUMENTS

| | | |
|---|---|---|
| 2017/0167974 A1 | 6/2017 | Koizumi |
| 2019/0128661 A1 | 5/2019 | Adams et al. |
| 2019/0383599 A1* | 12/2019 | Gregory ............. G01B 11/0625 |

FOREIGN PATENT DOCUMENTS

| | | |
|---|---|---|
| WO | 2018138523 A1 | 8/2018 |
| WO | 2019131840 A1 | 11/2020 |

OTHER PUBLICATIONS

EP19176500.7. EP Search Report (Nov. 4, 2019).
Corresponding JP Application No. JP2021519610. Office Action (Aug. 2, 2022).
Corresponding JP Application No. JP2021519610. Office Action (May 9, 2023).

* cited by examiner

MEASURING DEVICE AND METHOD OF OPERATING A MEASURING DEVICE

CROSS REFERENCE TO RELATED APPLICATIONS

The present application claims priority as a national stage application under 35 U.S.C. 371 to PCT Application No. PCT/EP2020/064440 filed on May 25, 2020, entitled, "Terahertz Measuring Device and Method of Operating a Terahertz Measuring Device," which claims priority to EP Application No. 19176500.7 filed on May 24, 2019, entitled "Terahertz measuring device and method of operating a terahertz measuring device," both of which are incorporated by reference herein.

FIELD

The disclosure relates to a method of operating a measuring device using Terahertz, THz, radiation. The disclosure further relates to a measuring device using THz radiation.

SUMMARY

Preferred embodiments relate to a method of operating a measuring device comprising a Terahertz, THz, transmitter configured to emit a THz signal to an object to be measured and a THz receiver configured to receive a reflected portion of said THz signal that has been reflected by said object, wherein said THz transmitter and said THz receiver are arranged in a measuring head of said measuring device, said method comprising: varying a distance between said measuring head and said object to be measured, emitting, by means of said THz transmitter, said THz signal to said object to be measured, receiving said reflected portion of said THz signal, determining a first parameter characterizing a detected signal proportional and/or related to said received reflected portion of said THz signal. This way, depending on said first parameter, e.g. a suitability of a specific value of the distance may be evaluated and/or a tuning process regarding said distance, e.g. for further measurements, may be facilitated. According to further preferred embodiments, said determining of said first parameter characterizing a detected signal proportional and/or related to said received reflected portion of said THz signal comprises determining a, preferably integral, THz power associated with said received reflected portion of said THz signal, wherein preferably said (integral) THz power may be determined in the time domain and/or the frequency domain. According to further preferred embodiments, said detected signal proportional and/or related to said received reflected portion of said THz signal can be determined using procedures for detecting THZ signals as known by those skilled in the art.

Particularly, according to further preferred embodiments, cf. the explanations further below, it is also possible to determine whether an actual distance between said measuring head and said object to be measured corresponds with an optimum distance.

According to further preferred embodiments, said distance is at least varied between two different values, and for said at least two different values said steps of emitting, receiving, and determining said first parameter are performed, which enables to evaluate said first parameter for said at least two different distance values.

According to further preferred embodiments, said emitting of said THz signal may e.g. be performed at least temporarily, preferably in the form of THz pulses, preferably at a specific point in time at which a (new) distance has been set (i.e., according to further preferred embodiments, said steps of emitting and receiving are preferably not performed while the distance is varied). Similarly, according to further preferred embodiments, said receiving of said reflected portion of said THz signal may also be performed at least temporarily, preferably synchronized with said step of emitting.

According to further preferred embodiments, said THz signal comprises THz radiation which comprises at least one frequency component in the range of 0.3 THz and 100 THz, preferably in the range of 0.5 THz and 10 THz. According to further preferred embodiments, said THz radiation comprises several frequency components in the range of 0.3 THz and 100 THz, preferably in the range of 0.5 THz and 10 THz.

According to further preferred embodiments, said THz signal comprises THz radiation which comprises THz pulses, wherein at least 60 percent of the signal energy of a single THz pulse is allocated in a frequency range between 0.3 THz and 100 THz, preferably between 0.5 THz and 10 THz, wherein more preferably at least 80 percent of the signal energy of said THz pulse is allocated in a frequency range between 0.3 THz and 100 THz, preferably between 0.5 THz and 10 THz.

According to further preferred embodiments, said distance is varied within a predetermined first range (either continuously or in discrete steps, depending on at least one drive used according to further preferred embodiments), said method further comprising: repeating said steps of varying a distance between said measuring head and said object to be measured, emitting (at least temporarily, e.g. in the form of pulses), by means of said THz transmitter, said THz signal to said object to be measured, receiving said reflected portion of said THz signal, determining said first parameter characterizing a detected signal proportional and/or related to said received reflected portion of said THz signal, wherein said repeating of these steps is preferably performed until said first parameter exceeds a predetermined first threshold and/or reaches a maximum with respect to said predetermined first range.

According to further preferred embodiments, a value of said distance which is associated with said maximum of said first parameter represents an optimum measuring distance which may preferably be used for future measurements by means of said measuring device.

According to further preferred embodiments, said optimum measuring distance is determined based on said first parameter.

According to further preferred embodiments, said optimum measuring distance is at least temporarily stored, e.g. for future use.

According to further preferred embodiments, particularly once said optimum measuring distance has been determined, said optimum measuring distance is used for (further) measurements based on transmitting said THz signal and receiving a reflected portion of said THz signal. According to further preferred embodiments, such (further) measurements may e.g. comprise one or more layer thickness measurements, e.g. of a plurality of layers arranged on said object to be measured, e.g. a body (for example, several layers of paint arranged on a vehicle part or the like).

According to further preferred embodiments, said further measurement(s), e.g. layer thickness measurements or the like, may comprise the following steps: determining reference measurement information based on one or more measurements using a reference object, determining measurement information based on one or more measurements using a real object to be measured, e.g. a device under test, evaluating said measurement information of the real object to be measured depending on said reference measurement information to obtain measurement results. This advantageously enables to eliminate undesired properties or deviations from reference properties of individual measuring devices (and/or components thereof) leading to more precise measurement results.

According to further preferred embodiments, measurements for determining reference measurement information may comprise emitting a THz signal, preferably to the reference object, receiving a reflected portion of said THz signal that has been reflected by said reference object, and said reference measurement information may be determined based on said received reflected portion of said THz signal. According to further preferred embodiments, said reference measurement information may comprise and/or characterize a signal shape, particularly a time series and/or a frequency spectrum, characterizing the received reflected portion of said THz signal that has been reflected by the reference object. Similarly, according to further preferred embodiments, said measurement information may comprise or characterize a signal shape, particularly a time series and/or a frequency spectrum, characterizing the received reflected portion of said THz signal that has been reflected by the device under test.

According to further preferred embodiments, said method further comprises: for at least one distance value of said distance between said measuring head and said object to be measured, preferably for a plurality of distance values within said predetermined first range: determining and/or storing said distance value(s) (in some cases, a step of determining said distance values may be omitted, e.g. if said distance values are already known with sufficient precision), determining and storing first reference measurement information characterizing a received reflected portion of said THz signal associated with said at least one distance value.

According to further preferred embodiments, and similar to the abovementioned reference measurement information, said first reference measurement information may comprise or characterize a signal shape, particularly a time series (e.g. characterizing a pulse shape of a received reflected THz pulse) and/or a frequency spectrum, characterizing the received reflected portion of said THz signal.

This way, at least one set of first reference measurement information may be determined for each of said distance values as mentioned above, which inter alia comprises information on an optical signal path (associated with said distance value(s)) between said measuring head and said object to be measured.

According to further preferred embodiments, said first reference measurement information may be used for further measurements by means of said measuring device, e.g. to modify results obtained by said further measurements.

According to further preferred embodiments, said method further comprises: varying a relative angular position of said measuring head with respect to said object to be measured, emitting (at least temporarily), by means of said THz transmitter, said THz signal (preferably in form of one or more pulses) to said object to be measured, receiving said reflected portion of said THz signal, determining a second parameter characterizing a detected signal proportional and/or related to said received reflected portion of said THz signal.

According to further preferred embodiments, said detected signal characterized by said first and/or second parameter may be determined in the time domain and/or in the frequency domain.

According to further preferred embodiments, said step of determining said first parameter and/or said step of determining said second parameter and/or said step of determining and storing first reference measurement information and/or said step of determining and storing second reference measurement information (see below for further details) comprises applying a (respective) filtering process to said received reflected portion of said THz signal. According to further preferred embodiments, different filtering processes may be applied when determining said first parameter and when determining said second parameter and/or the respective reference measurement information. This way, according to further preferred embodiments, signal components with e.g. poor signal-to-noise ratio, SNR, may be eliminated prior to determining said first and/or second parameter and/or the respective reference measurement information thus increasing precision. According to further preferred embodiments, by choosing a desired filter characteristic, an optimization regarding the determination of the respective first and/or second parameter and/or the respective reference measurement information may be performed. According to further preferred embodiments, preferably, when using reference measurement information that has been obtained depending on a filtering process as explained below, a similar or identical filtering process may also be applied to measurement information that may be processed depending on said reference measurement information.

According to further preferred embodiments, said step of varying said relative angular position comprises varying said relative angular position in more than one spatial direction, preferably in two spatial directions, which are preferably orthogonal to each other.

According to further preferred embodiments, said relative angular position is varied within a predetermined second range, said method further comprising: repeating said steps of varying said relative angular position, emitting (at least temporarily), by means of said THz transmitter, said THz signal to said object to be measured, receiving said reflected portion of said THz signal, determining said second parameter characterizing a detected signal proportional and/or related to said received reflected portion of said THz signal, preferably until said second parameter exceeds a predetermined second threshold and/or reaches a maximum with respect to said predetermined second range, wherein preferably a value of said relative angular position which is associated with said maximum of said second parameter represents an optimum measuring angle, wherein preferably said optimum measuring angle is at least temporarily stored. According to further preferred embodiments, said optimum measuring angle may be characterized in that a surface normal of the object to be measured is parallel to a reference axis (e.g., optical axis) of said measuring device and/or its measuring head.

According to further preferred embodiments, particularly once said optimum measuring angle has been determined, said optimum measuring angle is used for (further) measurements based on transmitting said THz signal and receiving a reflected portion of said THz signal. According to further preferred embodiments, such (further) measurements may e.g. comprise one or more layer thickness measurements, e.g. of a plurality of layers arranged on a body (e.g., several layers of paint arranged on a vehicle part or the like). According to further preferred embodiments, said predetermined second range may represent a one-dimensional range or a two-dimensional range.

According to further preferred embodiments, said step of emitting said THz signal comprises emitting THz pulses, preferably a predetermined number of THz pulses, preferably at a predetermined pulse repetition rate. According to further preferred embodiments, a specific number of THz pulses, especially more than one THz pulse, may be emitted for each value of said distance and/or said relative angular position, which may further increase precision.

According to further preferred embodiments, said method further comprises: for at least one relative angular position value of said relative angular position between said measuring head and said object to be measured, preferably for a plurality of relative angular position values of said predetermined second range: determining and/or storing said relative angular position value(s) (in some cases, a step of determining said relative angular position may be omitted, e.g. if said relative angular position is already known with sufficient precision), determining and storing second reference measurement information characterizing a received reflected portion of said THz signal associated with said at least one relative angular position value.

According to further preferred embodiments, said second reference measurement information may comprise and/or characterize a signal shape, particularly a time series and/or a frequency spectrum, characterizing the received reflected portion of said THz signal. In this respect, according to further embodiments, there may be no difference regarding the type of data embodied by the first reference measurement information and the second reference measurement information.

This way, at least one set of second reference measurement information may be determined for each of said angular position values as mentioned above, which inter alia comprises information on an optical signal path (associated with said angular position value(s)) between said measuring head and said object to be measured.

According to further preferred embodiments, a specific spatial orientation of the measuring head with respect to the object to be measured may be characterized by a distance between these elements and by a relative angular position, and this specific spatial orientation may be associated with one or more sets of either first reference measurement information and/or second reference measurement information.

According to further preferred embodiments, said second reference measurement information may be (either alone or in combination with optionally provided first reference measurement information) used for further measurements by means of said measuring device.

According to further preferred embodiments, said method further comprises determining said distance, preferably by means of at least one distance sensor, e.g. a triangulation sensor, and/or a three-dimensional (3D-) scanner.

According to further preferred embodiments, said method further comprises determining said relative angular position, preferably by means of at least one angular position sensor, e.g. an optical angular position sensor, preferably a 3D-scanner, capable of detecting a surface shape and/or surface position and/or surface orientation. According to further preferred embodiments, said optical angular position sensor is arranged such that its optical axis is coaxial with and/or parallel to a reference axis, e.g. optical axis, of the measuring head. Preferably, according to further embodiments, a measuring spot of the optical angular position sensor lies within the focal point of the THz signal of the measuring head.

According to further preferred embodiments, said step of varying said distance between said measuring head and said object to be measured comprises moving, preferably in a translatory movement, preferably by a first drive, said measuring head with respect to said object to be measured and/or moving, preferably in a translatory movement, preferably by a second drive, said object to be measured with respect to said measuring head.

According to further preferred embodiments, said first drive and/or said second drive comprises a high-precision linear actuator for driving said preferably translatory movement, wherein a resolution of said translatory movement is e.g. 5 micrometer (µm) or less. According to further preferred embodiments, said first drive and/or said second drive may alternatively or additionally provide for rotational movement, wherein an angular resolution of said rotational movement is e.g. 0.05° (degrees) or less.

According to further preferred embodiments, said step of varying said relative angular position of said measuring head with respect to said object to be measured comprises rotating, preferably by a or said first drive, said measuring head with respect to said object to be measured and/or rotating, preferably by a or said second drive, said object to be measured with respect to said measuring head.

According to further preferred embodiments, said first drive may be configured to drive both a translatory movement and a rotational movement of said measuring head with respect to the object to be measured. According to further preferred embodiments, said second drive may be configured to drive both a translatory movement and a rotational movement of said object to be measured with respect to the measuring head. According to further embodiments, different, particularly separate drives may also be used for driving the different types of movement of said measuring head and/or said object to be measured.

According to further preferred embodiments, a pivot point associated with said rotation is arranged within a surface region of said object to be measured, wherein further preferably a focal point of said THz signal ("measuring spot", German: "Messfleck") is also arranged within said surface region, thus ensuring to avoid any distance error that may be caused by a rotational movement with a pivot point not within said surface of the object and/or outside the focal point.

According to further preferred embodiments, said method further comprises determining an or the optimum measuring distance, preferably by performing the method according to the embodiments.

According to further preferred embodiments, said method further comprises determining an or the optimum measuring angle, preferably by performing the method according to the embodiments.

According to further preferred embodiments, said method further comprises determining the optimum measuring distance and determining the optimum measuring angle, preferably by performing the method according to the embodiments. According to further preferred embodiments, said optimum measuring distance and said optimum measuring angle is used for performing further measurements.

According to further preferred embodiments, said method further comprises: building a database comprising a plurality of distance values and/or a plurality of relative angular position values and first reference measurement information associated with said plurality of distance values and/or second reference measurement information associated with said plurality of relative angular position values, wherein preferably for said step of building said database a first object is used as said object to be measured.

According to further preferred embodiments, the first object may represent a reference object reflecting THz radiation, particularly said THz signal, and preferably having a predetermined geometry, for example a planar surface.

According to further preferred embodiments, the first object may represent a reference object having a predetermined geometry, for example a non-planar (in one or two dimensions) surface.

According to further preferred embodiments, said method comprises: building a database comprising a plurality of distance values and a plurality of relative angular position values and first reference measurement information associated with said plurality of distance values and second reference measurement information associated with said plurality of relative angular position values. This way, first and/or second reference measurement information may efficiently be accessed and/or retrieved from said database for a given distance and/or a given relative angular position, e.g. for further measurements. As an example, when using the database, further THz based measurements such as the exemplarily mentioned layer thickness measurements may be made, wherein for an evaluation of said (layer thickness) measurements, reference measurement information may advantageously be retrieved from said database, e.g. instead of performing reference measurements.

In other words, the information comprised within said database may be used as reference information for further measurements of said measuring device (or at least one further measuring device of same/similar type).

According to further preferred embodiments, said method further comprises: performing further measurements using said THz signal, to obtain measurement results, wherein preferably for said step of performing further measurements, a second object is used as said object to be measured, wherein said second object is different from said first object. As an example, said first object may represent a reference object, e.g. with known geometry, whereas said second object may be a real device under test that may particularly comprise an unknown geometry or a geometry different from said reference object.

According to further preferred embodiments, said method further comprises modifying said measurement results depending on information from said database, whereby modified measurement results are obtained. This way, an increased precision is attained, wherein especially properties of individual measuring devices (and/or components thereof) and/or further undesired effects may at least partly be eliminated using the information from said database. Particularly, in some cases, positioning and/or alignment errors may occur with further measurements, for example due to a reduced positioning accuracy of a drive used for positioning said second object relative to the measuring device (and/or vice versa). Said positioning and/or alignment errors may be characterized by a suboptimal measuring distance and/or measuring angle to be set for said further measurements. In these cases, using a reference measurement that has been made with the optimal measuring distance and/or the optimal measuring angle, less precise measurement results may be obtained when processing measurement information with such reference measurement information. According to further preferred embodiments, in such cases, a suitable set of (first and/or second) reference information may be used, e.g. be retrieved from the database, e.g. depending on the actual suboptimal measuring distance and/or the actual suboptimal measuring angle, which enables to attain more precise measurements.

According to further preferred embodiments, for said step of performing measurements, a third drive is used for positioning the measuring head relative to said object to be measured. In other words, said third drive may e.g. be used to control the distance between the measuring head and the object under test and/or the relative angular position of said measuring head with respect to said object under test.

According to further preferred embodiments, said third drive may e.g. comprise a robot and/or a robotic arm or generally any manipulator configured to position the measuring head relative to the object under test. As a positioning accuracy of said robot may not be as high as the accuracy of the first drive and/or the second drive, positioning and/or alignment errors may occur when performing measurements using said THz signals. Insofar, according to further preferred embodiments, it may be desirable to evaluate measurement information using reference measurement information that is associated with the actual measuring distance and/or the actual measuring angle. According to further preferred embodiments, such information is comprised in the database obtained according to further preferred embodiments as explained above and may be used to at least partly compensate for said positioning and/or alignment errors.

According to further preferred embodiments, said method comprises determining a layer thickness of a plurality of layers arranged on a body (e.g., several layers of paint arranged on a vehicle part or the like), wherein said determination may e.g. be made on the basis of said received reflected portion of the THz signal, e.g. by applying a time-domain reflectometry (TDR) technique.

Further preferred embodiments relate to a measuring device comprising a Terahertz, THz, transmitter configured to emit a THz signal to an object to be measured and a THz receiver configured to receive a reflected portion of said THz signal that has been reflected by said object, wherein said THz transmitter and said THz receiver are arranged in a measuring head of said measuring device, said measuring device being configured to perform the following steps: varying a distance between said measuring head and said object to be measured, emitting, by means of said THz transmitter, said THz signal to said object to be measured, receiving said reflected portion of said THz signal, determining a first parameter characterizing a detected signal proportional and/or related to said received reflected portion of said THz signal.

According to further preferred embodiments, said measuring device is configured to perform the method according to the embodiments.

Further preferred embodiments relate to a use of the method according to the embodiments and/or of the measuring device according to the embodiments for performing and/or preparing layer thickness measurements, particularly of a plurality of layers arranged on a body, particularly of a) wet paint layers that have not yet dried and/or of b) drying paint layers and/or of c) dry paint layers, wherein preferably said method and/or said measuring device is used A) in a stationary configuration and/or B) in a nonstationary configuration, especially with a robot, particularly an industrial robot.

Further advantageous aspects and embodiments are provided in the dependent claims.

BRIEF DESCRIPTION OF THE DRAWINGS

Further features, aspects and advantages of the embodiments are given in the following detailed description with reference to the drawings in which.

DETAILED DESCRIPTION

Figure 1:
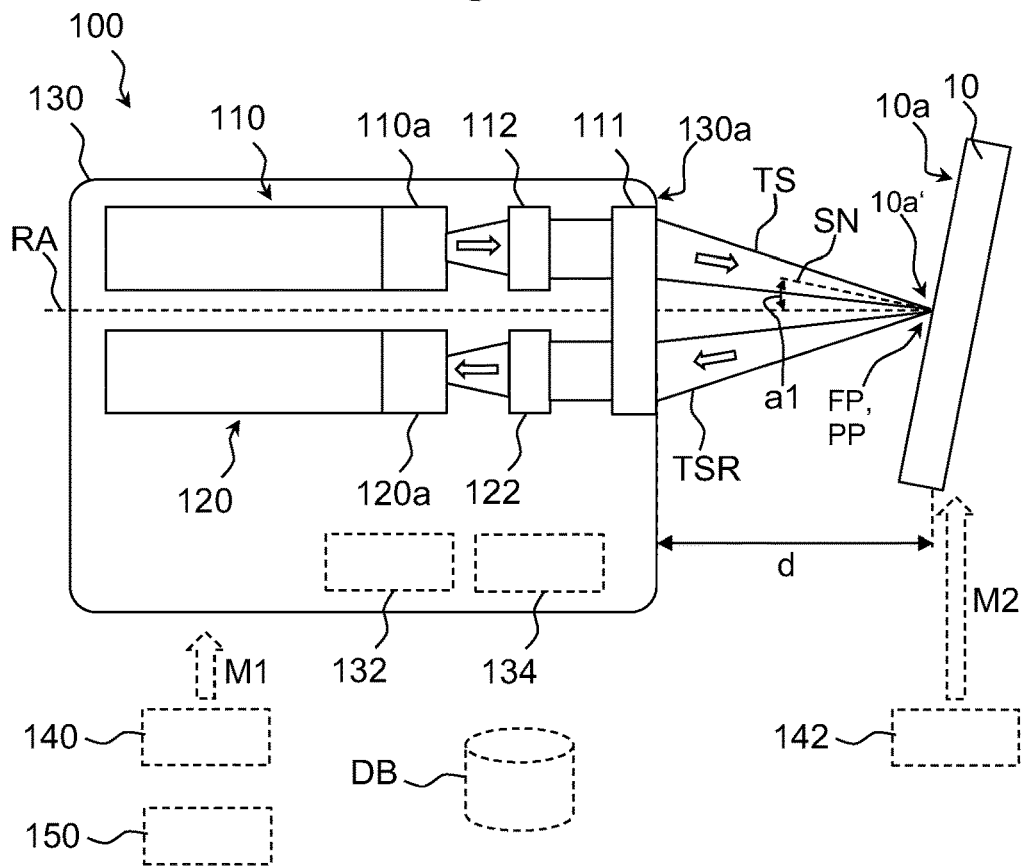
FIG. 1 schematically depicts a simplified block diagram of a measuring device according to embodiments.

FIG. 1 schematically depicts a simplified block diagram of a measuring device 100 according to preferred embodiments. The measuring device 100 comprises a Terahertz, THz, transmitter 110 configured to emit a THz signal TS to an object 10 to be measured and a THz receiver 120 configured to receive a reflected portion TSR of said THz signal TS that has been reflected by said object 10. For this purpose, the THz transmitter 110 comprises a THz emitter 110a and associated emitter optics 112, and the THz receiver 120 comprises a THz detector and associated detector optics 122.

According to further preferred embodiments, said THz transmitter 110 and said THz receiver 120 are arranged in a, preferably hermetically sealed, measuring head 130 of said measuring device 100, which may comprise a THz transmission element (e.g. protective window and/or optical lens) 111 enabling said THz signals TS to be irradiated onto the object 10 located outside of said measuring head 130 and enabling said received reflected portion TSR to enter the measuring head 130. According to further preferred embodiments, said protective window 111 is exchangeable.

According to further preferred embodiments, the elements 110a, 112, 120a, 122 are aligned with a reference axis RA of said measuring head 130 such that their respective optical axis (not shown) is parallel to said reference axis RA, said reference axis RA representing an optical axis of the measuring head 130.

Figure 2:
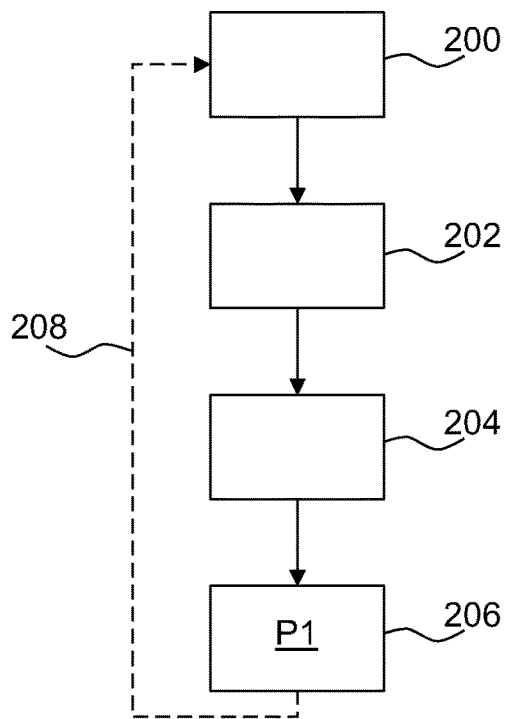
FIG. 2 schematically depicts a simplified flow-chart of a method according to further embodiments.

According to further preferred embodiments, said measuring device 100 is configured to perform the following steps, cf. the simplified flow-chart of FIG. 2: varying 200 a distance d (FIG. 1) between said measuring head 130 (e.g. an outer surface 130a of said measuring head 130) and said object 10 to be measured (e.g., a surface 10a of said object 10), emitting 202 (FIG. 2), by means of said THz transmitter 110, said THz signal TS to said object 10 to be measured, receiving 204 said reflected portion TSR of said THz signal TS, determining 206 a first parameter P1 characterizing a detected signal proportional and/or related to said received reflected portion TSR of said THz signal TS.

According to further preferred embodiments, said determining 206 of said first parameter P1 characterizing a detected signal proportional and/or related to said received reflected portion TSR of said THz signal TS comprises determining a, preferably integral, THz power associated with said received reflected portion TSR of said THz signal TS, wherein preferably said (integral) THz power may be determined in the time domain and/or the frequency domain.

According to further preferred embodiments, said detected signal proportional and/or related to said received reflected portion TSR of said THz signal TS can be determined using procedures for detecting THZ signals as known by those skilled in the art. In other words, by applying such detection technique, the detected signal, which is proportional and/or related to said received reflected portion TSR of said THz signal TS, may be determined from the received reflected portion TSR of said THz signal TS, and as mentioned above, preferably, in step 206, said first parameter P1 characterizing said detected signal is determined. As an example, according to further preferred embodiments, the determination of the detected signal may also be performed in said step 204 of receiving.

This way, depending on said first parameter P1, e.g. a suitability of a specific value of the distance d (FIG. 1), e.g. for a specific type of further measurements or generally precise measurements, may be evaluated and/or a tuning process regarding said distance, e.g. for further measurements, may be facilitated.

According to further embodiments, a control device 150 may be provided to control an operation of said measuring device 100, particularly for performing the method according to the embodiments.

According to further preferred embodiments, said emitting 202 (FIG. 2) of said THz signal TS (FIG. 1) may e.g. be performed at least temporarily, preferably in the form of THz pulses. Similarly, according to further preferred embodiments, said receiving 204 of said reflected portion TSR of said THz signal may also be performed at least temporarily, preferably synchronized with said step of emitting 202.

According to further preferred embodiments, said THz signal TS (FIG. 1) comprises THz radiation which comprises at least one frequency component in the range of 0.3 THz and 100 THz, preferably in the range of 0.5 THz and 10 THz. According to further preferred embodiments, said THz radiation comprises several frequency components in the range of 0.3 THz and 100 THz, preferably in the range of 0.5 THz and 10 THz.

According to further preferred embodiments, said THz signal TS comprises THz radiation which comprises THz pulses, wherein at least 60 percent of the signal energy of a single THz pulse is allocated in a frequency range between 0.3 THz and 100 THz, preferably between 0.5 THz and 10 THz, wherein more preferably at least 80 percent of the signal energy of said THz pulse is allocated in a frequency range between 0.3 THz and 100 THz, preferably between 0.5 THz and 10 THz.

According to further preferred embodiments, said distance d (FIG. 1) is varied, cf. step 200 of FIG. 2, within a predetermined first range, said method further comprising: repeating 208 said steps 200, 202, 204, 206, preferably until said first parameter P1 exceeds a predetermined first threshold and/or reaches a maximum with respect to said predetermined first range. According to further preferred embodiments, said predetermined first range comprises 20% or more, preferably 50% or more, of an overall distance range that may be used or set by means of said apparatus 100 (FIG.

1) and/or at least one drive 140, 142 of said apparatus. Details of the drive(s) 140, 142 according to further preferred embodiments are explained further below.

According to further preferred embodiments, a value of said distanced (FIG. 1) which is associated with said maximum of said first parameter P1 (FIG. 2) represents an optimum measuring distance omd (FIG. 4) which may preferably be used for further and/or future measurements by means of said measuring device 100 (and/or a similar or identical further measuring device). According to further preferred embodiments, said optimum measuring distance omd is at least temporarily stored, e.g. for future use.

Figure 4:
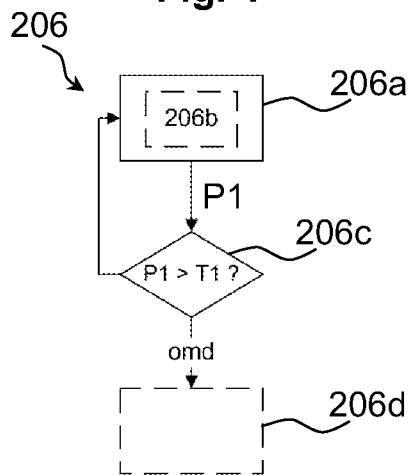
FIGS. 4 to 9 each schematically depict a simplified flow-chart of a method according to further embodiments, FIG. 10 schematically depicts a simplified block diagram of a control unit according to further embodiments, FIG. 11A schematically depicts a first operational scenario according to further embodiments, FIG. 11B schematically depicts a second operational scenario according to further embodiments, FIG. 12 schematically depicts a simplified flow-chart of a method according to further embodiments, FIG. 13 schematically depicts a simplified flow-chart of a method according to further embodiments, FIG. 14. schematically depicts a simplified side view of an operational scenario according to further embodiments.

In this respect, FIG. 4 exemplarily depicts a simplified flow-chart related to determining 206 said first parameter P1 according to further preferred embodiments. In step 206a, said first parameter P1, is determined. Optionally, a filtering process, cf. step 206b, which is explained further below, may be performed. In step 206c, it is determined if said first parameter P1 (as determined by step 206a) exceeds said predetermined first threshold T1. Alternatively, in step 206c it may be determined if said first parameter P1 reaches a maximum with respect to said predetermined first range within which said distanced (FIG. 1) is varied, cf. step 200 of FIG. 2. If so, the current distance (used for the determination of said first parameter P1 according to said step 206a) represents the optimum measuring distance omd, which may be at least temporarily stored, cf. the optional step 206d.

According to further embodiments, the determination of the optimum measuring distance omd may comprise varying 200 said distance d within said predetermined first range, determining a value of said first parameter P1 associated with each distance value (cf. steps 202, 204, 206), identifying a specific distance value within said predetermined first range which is associated with the maximum value of said first parameter P1, and using said specific distance value as said optimum measuring distance omd. Depending on the size of said predetermined first range and a minimum step size which characterizes the variation 200 of said distance d, a corresponding number of repetitions 208 (FIG. 2) of the steps 200, 202, 204, 206 may be performed according to further embodiments.

According to further embodiments, once the optimum measuring distance omd has been obtained, further measurements are performed using said optimum measuring distance omd as said distance d.

Figure 6:
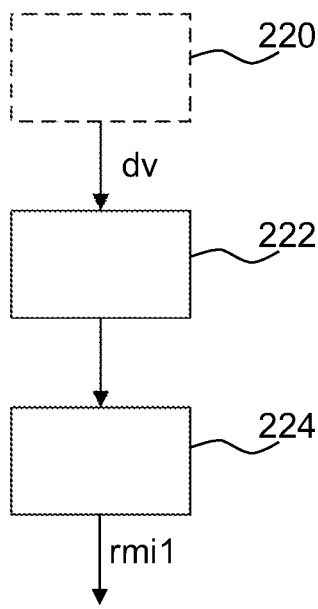

According to further preferred embodiments, cf. the simplified flow-chart of FIG. 6, said method further comprises: for at least one distance value dv of said distance d between said measuring head 130 and said object 10 to be measured, preferably for a plurality of distance values within said predetermined first range: determining 220 and/or storing 222 said distance value(s) dv (in some cases, a step of determining 220 said distance value(s) dv may be omitted, e.g. if said distance values dv are already known with sufficient precision, either as an absolute value as e.g. obtained by measurement and/or a relative (increment) value with respect to a previously set distance), determining and storing 224 first reference measurement information rmi1 characterizing a received reflected portion TSR of said THz signal TS associated with said at least one distance value dv.

As an example, if the process explained above with reference to FIG. 6 is performed for four distinct distance values dv, the first reference measurement information rmi1 comprises four different values or data sets, respectively, of said first reference measurement information rmi1, each value being associated with a respective one of said four distinct distance values dv.

According to further preferred embodiments, said first reference measurement information rmi1 may comprise or characterize a signal shape (time series and/or frequency spectrum and/or information derived therefrom) characterizing the received reflected portion TSR as obtained for a specific distance d. In other words, for a plurality of different distance values dv, the first reference measurement information rmi1 may be characterized by a corresponding plurality of signal shape (time series and/or frequency spectrum and/or information derived therefrom).

According to further preferred embodiments, said first reference measurement information rmi1 may be used to avoid and/or compensate errors due to misalignments of the measuring device 100, particularly its measuring head 130, and the object 10 to be measured, especially for future measurements where e.g. a reduced positioning accuracy may be given—as compared to the process of FIG. 6. In these situations, a distance error of future measurements may e.g. be compensated by using said first reference measurement information rmi1. Further exemplary details and advantages of using said first reference measurement information rmi1 are described further below, e.g. with reference to FIGS. 11A, 11B.

Figure 3:
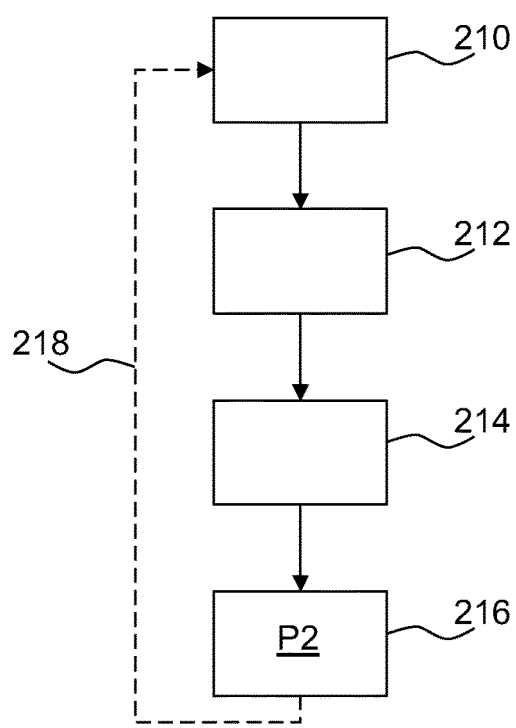
FIG. 3 schematically depicts a simplified flow-chart of a method according to further embodiments.

According to further preferred embodiments, cf. the simplified flow-chart of FIG. 3, the method of operating the measuring device 100 (FIG. 1) may comprise: varying 210 a relative angular position of said measuring head 130 with respect to said object 10 to be measured, emitting 212 (at least temporarily), by means of said THz transmitter 110 (FIG. 1), said THz signal TS to said object 10 to be measured, receiving 214 (FIG. 3) said reflected portion TSR of said THz signal TS, determining 216 a second parameter P2 characterizing a detected signal proportional and/or related to said received reflected portion TSR of said THz signal TS.

According to further preferred embodiments, said second parameter P2 (also) characterizes a detected signal proportional and/or related to the received reflected portion of said THz signal. According to further preferred embodiments, said second parameter P2 of the received reflected portion of said THz signal may be determined in the time domain and/or in the frequency domain, similar to said first parameter P1, cf. FIG. 2. According to further preferred embodiments, said determining 216 of said second parameter P2 characterizing a detected signal proportional and/or related to said received reflected portion TSR of said THz signal TS comprises determining a, preferably integral, THz power associated with said received reflected portion TSR of said THz signal TS, wherein preferably said (integral) THz power may be determined in the time domain and/or the frequency domain.

According to further preferred embodiments, said step of determining 206 (FIG. 2) said first parameter P1 and/or said step of determining 216 (FIG. 3) said second parameter P2 comprises applying 206b (FIG. 4), 216b (FIG. 5) a (respective) filtering process to said received reflected portion TSR of said THz signal. According to further preferred embodiments, different filtering processes 206b, 216b may be applied when determining said first parameter P1 and when determining said second parameter P2. This way, signal components with e.g. a comparatively low signal-to-noise ratio, SNR, may be eliminated prior to determining said first and/or second parameter P1, P2 thus increasing precision.

According to further preferred embodiments, similarly, one or more filtering processes may be applied when determining said first reference measurement information rmi1

(and optionally also when determining second reference measurement information rmi2, see further below).

According to further preferred embodiments, by choosing a desired filter characteristic, an optimization regarding the determination of the respective first and/or second parameter P1, P2 may be performed. Similar observations apply to the determination of the reference measurement information rmi1, rmi2.

According to further preferred embodiments, cf. the simplified flow-chart of FIG. 3, said step of varying 210 said relative angular position comprises varying said relative angular position in more than one spatial direction, preferably in two spatial directions, which are preferably orthogonal to each other. A first variation of said relative angular position in a first spatial direction, which exemplarily corresponds to a coordinate within the drawing plane of FIG. 1, is exemplarily depicted in FIG. 1 by reference sign a1. As a further example, a second spatial direction that may be used for variation of said relative angular position may extend orthogonally through the drawing plane of FIG. 1.

According to further preferred embodiments, said relative angular position is varied, cf. step 210 of FIG. 3, within a predetermined second range, said method further comprising: repeating 218 said steps 210, 212, 214, 216, preferably until said second parameter P2 exceeds a predetermined second threshold T2 (FIG. 5) and/or reaches a maximum with respect to said predetermined second range, wherein preferably a value of said relative angular position which is associated with said maximum of said second parameter P2 represents an optimum measuring angle, wherein preferably said optimum measuring angle is at least temporarily stored. According to further preferred embodiments, said optimum measuring angle may be characterized in that a surface normal SN (FIG. 1) of a surface 10a of the object 10 to be measured is parallel to the reference axis RA of said measuring device 100 and/or its measuring head 130.

According to further preferred embodiments, said predetermined second range may represent a one-dimensional range or a two-dimensional range, as mentioned above. According to further preferred embodiments, in case of a two-dimensional angular range, said varying 210 may comprise varying said relative angular position in a first one of said two angular dimensions, and, after that, varying said relative angular position in a second one of said two angular dimensions. According to further preferred embodiments, any other sequence and/or subsequent variations of the angular range in different ones of said two angular positions are also possible.

According to further preferred embodiments, said predetermined (one- or two-dimensional) second range comprises 20% or more, preferably 50% or more, of an overall angular range that may be used or set by means of said apparatus 100 (FIG. 1) and/or at least one drive 140, 142, 144 of said apparatus 100. As already mentioned above, details of the drive(s) 140, 142, 144 are explained further below.

Figure 5:
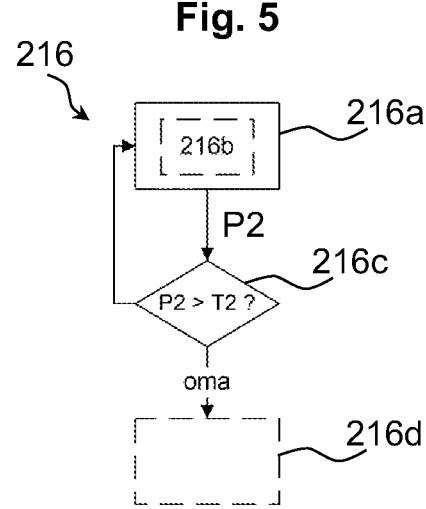

FIG. 5 exemplarily depicts a simplified flow-chart related to determining 216 said second parameter P2 according to further preferred embodiments. In step 216a, said second parameter P2 is determined. Optionally, a filtering process, cf. step 216b, may be performed. In step 216c, it is determined if said second parameter P2 (as determined by step 216a) exceeds said predetermined second threshold T2. Alternatively, in step 216c it may be determined if said second parameter P2 reaches a maximum with respect to said predetermined second range within which said relative angular position d (FIG. 1) is varied, cf. step 210 of FIG. 3. If so, the current relative angular position (used for the determination of said second parameter P2 according to said step 216a) represents the optimum measuring angle oma, which may be at least temporarily stored, cf. the optional step 216d.

According to further embodiments, the determination of the optimum measuring angle oma may comprise varying 210 (FIG. 3) said relative angular position within said predetermined second range, determining 212 a value of said second parameter P2 associated with each angular position value (cf. steps 212, 214, 216), identifying a specific angular position value within said predetermined second range which is associated with the maximum value of said second parameter P2, and using said specific angular position value as said optimum measuring angle oma. Depending on the size of said predetermined second range and a minimum step size which characterizes the variation 210 of said angular position a1 (exemplary for one dimension), a corresponding number of repetitions 218 (FIG. 3) of the steps 210, 212, 214, 216 may be performed according to further embodiments.

According to further embodiments, once the optimum measuring angle oma has been obtained, further, i.e. future measurements are performed using said optimum measuring angle oma for said relative angular position.

According to further preferred embodiments, said step 202, 212 of emitting said THz signal TS comprises emitting THz pulses, preferably a predetermined number of THz pulses, preferably at a predetermined pulse repetition rate. According to further preferred embodiments, a specific number of THz pulses, especially more than one THz pulse, may be emitted 202, 212 for each value of said distance and/or said relative angular position, which may further increase precision.

Figure 7:
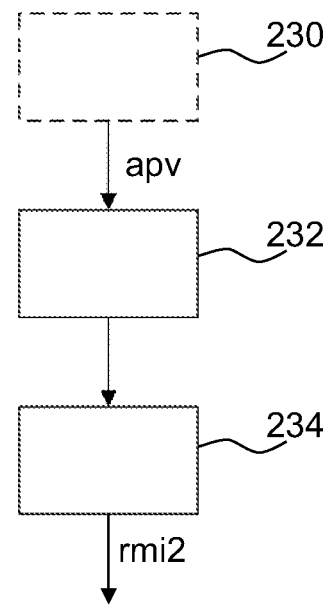

According to further preferred embodiments, cf. the simplified flow-chart of FIG. 7, said method further comprises: for at least one relative angular position value apv of said relative angular position between said measuring head 130 (FIG. 1) and said object 10 to be measured, preferably for a plurality of relative angular position values apv of said predetermined second range: determining 230 and/or storing 232 said relative angular position value(s) (in some cases, a step of determining 230 said relative angular position (value(s)) may be omitted, e.g. if said relative angular position is already known with sufficient precision), determining 234 and storing second reference measurement information rmi2 characterizing a received reflected portion TSR of said THz signal TS associated with said at least one relative angular position value apv.

According to further preferred embodiments, said second reference measurement information rmi2 may comprise and/or characterize a signal shape (time series and/or frequency spectrum and/or information derived therefrom) characterizing the received reflected portion TSR as obtained for a specific relative angular position value apv.

According to further preferred embodiments, said second reference measurement information rmi2 may be (either alone or in combination with optionally provided first reference measurement information rmi1) used for further measurements, e.g. to avoid and/or compensate errors due to misalignments of the measuring device 100, particularly its measuring head 130, and the object 10 to be measured. Further exemplary details and advantages of using said second reference measurement information rmi2, optionally together with said first reference measurement information rmi1, are described further below, e.g. with reference to FIGS. 11A, 11B.

According to further preferred embodiments, said method of operating the measuring device 100 further comprises determining 220 (FIG. 6) said distanced (i.e., one or more distance values dv), preferably by means of at least one distance sensor 132 (FIG. 1), particularly a triangulation sensor and/or a three-dimensional (3D-) scanner. According to further preferred embodiments, said at least one distance sensor, e.g. triangulation sensor, 132 is arranged at (e.g., attached to) said measurement head 130, or integrated into said measurement head 130.

According to further preferred embodiments, alternative to or additionally to determining said distance d by means of a sensor 132, i.e. the triangulation sensor 132, a known relative displacement effected by a drive 140 (FIG. 1, cf. further below for details) used for varying the distanced may be evaluated for determining 220 said distance, i.e. known distance increments as applied e.g. in step 200 of FIG. 2.

According to further preferred embodiments, said method further comprises determining 230 (FIG. 7) said relative angular position, preferably by means of at least one angular position sensor 134, e.g. an optical angular position sensor 134 (FIG. 1), particularly a 3D-scanner. According to further preferred embodiments, said at least one optical angular position sensor 134 is arranged at (e.g., attached to) said measurement head 130, or integrated into said measurement head 130.

Figure 8:
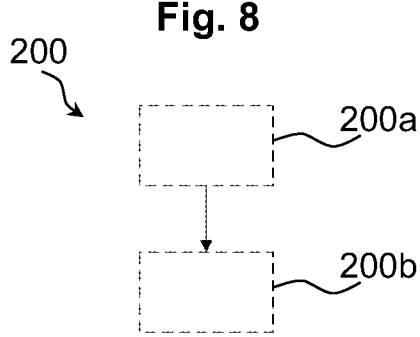

According to further preferred embodiments, cf. the flow-chart of FIG. 8, said step 200 of varying said distance d (FIG. 1) between said measuring head 130 and said object 10 to be measured comprises moving 200a, cf. FIG. 8 and the dashed block arrow M1 of FIG. 1, preferably in a translatory movement, preferably by a first drive 140 (FIG. 1), said measuring head 130 with respect to said object 10 to be measured and/or moving 200b (cf. FIG. 8 and the dashed block arrow M2 of FIG. 1), preferably in a translatory movement, preferably by a second drive 142, said object 10 to be measured with respect to said measuring head 130.

According to further preferred embodiments, said first drive 140 and/or said second drive 142 comprises at least one, preferably high-precision, linear actuator for driving said preferably translatory movement.

Figure 9:
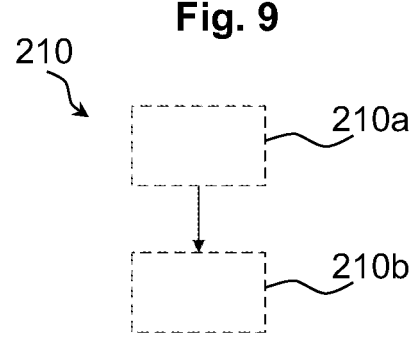

According to further preferred embodiments, cf. the flow-chart of FIG. 9, said step of varying 210 said relative angular position of said measuring head 130 with respect to said object 10 to be measured comprises rotating 210a, preferably by said first drive 140 (FIG. 1), said measuring head 130 with respect to said object 10 to be measured and/or rotating 210b, preferably by a or said second drive 142, said object 10 to be measured with respect to said measuring head 130. For this purpose, at least one of said drives 140, 142 may e.g. comprise a, preferably high-accuracy, goniometer, which preferably has a resolution and/or an accuracy of e.g. 0.05°.

According to further preferred embodiments, said first drive 140 (FIG. 1) may be configured to drive M1 both a translatory movement and a rotational movement of said measuring head 130 with respect to the object 10 to be measured. According to further preferred embodiments, said second drive 142 may be configured to drive M2 both a translatory movement and a rotational movement of said object 10 to be measured with respect to the measuring head 130. According to further embodiments (not shown), different, particularly separate, drives may be used for driving the different types of movement (translatory and/or rotational) of said measuring head 130 and/or said object 10 to be measured.

According to further preferred embodiments, a pivot point PP (FIG. 1) associated with said rotation (of the measuring head 130 and/or the object 10) is arranged within a surface $10a'$ region of said surface $10a$ of said object 10 to be measured, wherein further preferably a focal point FP of said THz signal TS (which may also be characterized as "measuring spot", German: "Messfleck") is also arranged within said surface region $10a'$, thus ensuring to avoid any distance error that may be caused by a rotational movement with a pivot point not within said surface $10a$ of the object and/or outside the focal point FP. As an example, according to further embodiments, the distance d may be set to the abovementioned optimum measuring distance omd to ensure that said focal point FP lies within the surface $10a$ of the object 10. According to further embodiments, at least one of the drives 140, 142, e.g. a goniometer thereof, may be arranged and/or adjusted such that the pivot point PP of said rotation effected by said drive also lies within the surface $10a$ of the object 10, and preferably coincides with said focal point FP.

According to further preferred embodiments, said method of operating the measuring device 100 (FIG. 1) further comprises determining the optimum measuring distance omd (FIG. 4), preferably by performing the method according to the embodiments, cf. e.g. FIGS. 2, 4 as explained above.

According to further preferred embodiments, said method of operating the measuring device 100 further comprises determining the optimum measuring angle oma (FIG. 5), preferably by performing the method according to the embodiments, cf. e.g. FIGS. 3, 5 as explained above.

According to further preferred embodiments, said method of operating the measuring device 100 further comprises both determining the optimum measuring distance omd and determining the optimum measuring angle oma, preferably by performing the method according to the embodiments, cf. FIGS. 2 to 5. According to further preferred embodiments, said optimum measuring distance omd is determined first (this e.g. ensures that a focal point FP of the THz radiation lies within a virtual plane defined by the surface region $10a$, FIG. 1, which ensures optimum precision for further measurements), e.g. in accordance with a process according to FIG. 4, and after that, said optimum measuring angle oma is determined, e.g. in accordance with a process according to FIG. 5. However, according to some embodiments, it is also possible that said optimum measuring angle oma is determined first, and after that, said optimum measuring distance omd is determined.

Figure 11A:
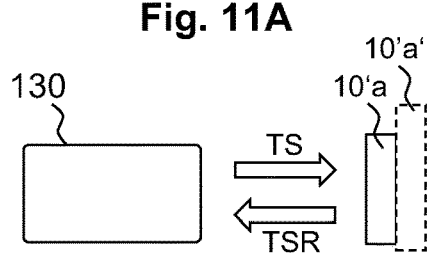
Figure 12:
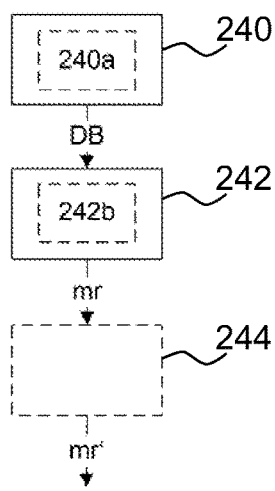

According to further preferred embodiments, cf. the simplified flow-chart of FIG. 12, said method of operating the measuring device further comprises: building 240 a database DB (FIG. 1) comprising a plurality of distance values dv (FIG. 6) and/or a plurality of relative angular position values apv (FIG. 7) and first reference measurement information rmi1 associated with said plurality of distance values dv and/or second reference measurement information rmi2 associated with said plurality of relative angular position values apv, wherein preferably for said step 240 of building said database DB a first object $10'a$ is used, cf. step 240a, as said object to be measured, cf. the schematic side view of FIG. 11A.

According to further preferred embodiments, the first object $10'a$ (FIG. 11A) may represent a reference object reflecting THz radiation, particularly said THz signal TS, and having a predetermined geometry, for example a planar (i.e., non-curved) surface. According to further preferred embodiments, a support $10'a'$ for receiving and/or fixation of said reference object 10'a, especially during the THz-based measurements, may be provided. According to further preferred embodiments, said support 10'a' may also comprise one or more drives 140, 142.

According to further preferred embodiments, the first object 10'a may also represent a reference object having a predetermined geometry, which may also comprise a non-planar (in one or two directions) surface.

According to further preferred embodiments, said step 240 (FIG. 12) of building said database DB comprises building a database DB comprising a plurality of distance values dv and a plurality of relative angular position values apv and first reference measurement information rmi1 associated with said plurality of distance values dv and second reference measurement information rmi2 associated with said plurality of relative angular position values apv. This way, a feature space having e.g. four dimensions is defined, said four dimensions corresponding to said distance, said relative angular position, said first reference measurement information and said second reference measurement information.

According to further preferred embodiments, at least parts of the information comprised within said database DB may be used for validating and/or modifying and/or improving further (future) measurements of said measuring device 100 (or at least one further measuring device (not shown) of same/similar type), e.g. by compensating and/or avoiding errors introduced into measurements due to deviations from a desired (optimum) distance d and/or (optimum) relative angular position, wherein said deviations may e.g. be caused by a less precise positioning device, as compared to e.g. the abovementioned first and second drives 140, 142.

Figure 11B:
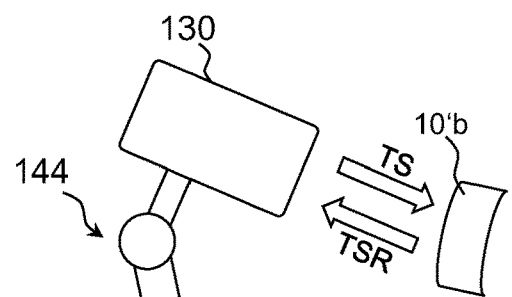

According to further preferred embodiments, said method, cf. FIG. 12, further comprises: performing 242 (further) measurements using said THz signal TS, to obtain measurement results mr, wherein preferably for said step of performing 242 measurements, a second object 10'b is used, cf. step 242b, as said object to be measured, wherein said second object 10'b is different from said first object, also cf. FIG. 11B. As an example, said first object 10'a (FIG. 11A) may represent the abovementioned reference object with known geometry, whereas said second object 10'b may be a real device under test that may particularly comprise an unknown geometry or a geometry different from that of said reference object. An exemplary scenario is depicted by FIG. 11B, wherein said measuring head 130 is attached to a third drive 144, and wherein THz-based (further) measurements are made emitting said THz signal TS to the device under test 10'b, which may e.g. have a non-planar surface (presently a convex surface).

According to further preferred embodiments, said method, cf. FIG. 12, further comprises modifying 244 said measurement results mr depending on information from said database DB, whereby modified measurement results mr' are obtained. This way, as mentioned above, errors such as positioning and/or alignment errors may be at least partly compensated, particularly without requiring a measurement to be repeated and/or a reference measurement to be performed.

According to further preferred embodiments, for said step 242 (FIG. 12) of performing further measurements, a third drive 144 (FIG. 11B) is used for positioning the measuring head 130 relative to said object 10'b to be measured. In other words, said third drive 144 may e.g. be used to control the distance d (FIG. 1) between the measuring head 130 and the object 10'b under test and/or the relative angular position of said measuring head 130 with respect to said object 10'b under test.

According to further preferred embodiments, said third drive 144 may e.g. comprise a robot and/or a robotic arm or generally any manipulator configured to position the measuring head 130 relative to the object under test 10'b. According to further preferred embodiments, a pivot point of said robot 144 may be arranged to coincide with the focal point FP (FIG. 1) of the THz signal of said measuring head 130, which may e.g. be attained by appropriately configuring a control tool for said robot 144, e.g. by setting a point of origin of a coordinate system for the robot's movements to said focal point FP.

As, according to some embodiments, a positioning accuracy of said robot 144 may not be as high as the accuracy of the first drive 140 (FIG. 1) and/or the second drive 142, positioning and/or alignment errors may occur when performing said further measurements 242 (FIG. 12) using said THz signals TS with the configuration of FIG. 11B. In view of this, according to further preferred embodiments, the information comprised in the database DB (FIG. 1) obtained according to preferred embodiments as explained above may be used to at least partly compensate these positioning and/or alignment errors, thus obtaining more precise modified measurement results mr'.

Figure 13:
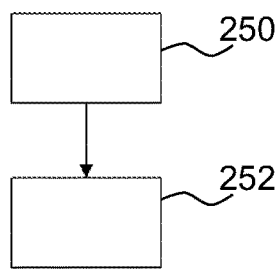
Figure 14:
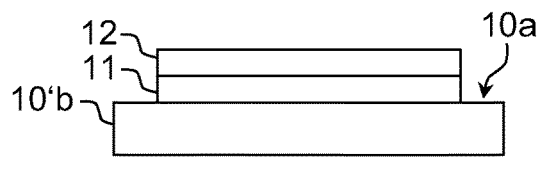

According to further preferred embodiments, cf. the simplified flow chart of FIG. 13, said method of operating the measuring device 100 comprises determining 250 a respective layer thickness of a plurality of layers 11, 12 (FIG. 14) arranged on a body 10'b (e.g., several layers 11, 12 of paint arranged on a vehicle part 10'b or the like), wherein said determination 250 may e.g. be made on the basis of said received reflected portion TSR (FIG. 11B) of the THz signal TS, e.g. by applying a time-domain reflectometry (TDR) technique.

According to further preferred embodiments, determining a respective layer thickness of a plurality of said layers 11, 12 may comprise: a) determining a reference pulse shape, e.g. by emitting a THz signal TS to the reference object 10'a (which is preferably a planar metallic object or an object with a planar metallic surface), b) determining a layer thickness measurement pulse shape, e.g. by emitting a THz signal TS to the object 10'b under test (which may e.g. be a vehicle part coated with one or more layers 10, 11, e.g. wet and/or drying and/or dry paint layers), c) optionally, performing a frequency domain analysis of said reference pulse shape, e.g. by applying an FFT (fast Fourier Transform) to said reference pulse shape, d) optionally, performing a frequency domain analysis of said layer thickness measurement pulse shape, e.g. by applying an FFT to said layer thickness measurement pulse shape, e) optionally, determining a normalized transfer function associated with the measuring device 100 depending on said frequency domain analysis of said layer thickness measurement pulse shape and said frequency domain analysis of said reference measurement pulse shape, preferably by dividing said FFT of said layer thickness measurement pulse shape by said FFT of said reference measurement pulse shape.

According to further preferred embodiments, said step a) may be performed by a first measurement system, which is e.g. provided for calibration and/or reference measurements, which may e.g. comprise high precision drive(s) 140, 142 and the reference object 10'a, cf. e.g. FIG. 11A. According to further preferred embodiments, said step b) may be performed by a second measurement system, which is e.g. provided for, preferably automated, layer thickness measurements, preferably in-line in a flow process of a plant, e.g. an (automobile) painting line, which may e.g. comprise one or more robots 144 for positioning the measuring device 130 relative to the object 10'b under test, cf. e.g. FIG. 11B.

In this exemplarily mentioned application of layer thickness measurement, the principle according to the embodiments may advantageously be used to improve 252 (FIG. 13) a precision of the layer thickness measurements, i.e. accounting for positioning errors and/or curved surfaces 10a of the object 10'b to be measured, and the like.

As an example, according to further preferred embodiments, if, for said layer thickness measurements 250 the measuring head 130 (FIG. 11B) cannot be properly positioned relative to the body 10'b, i.e. at the optimum measuring distance omd and/or the optimum measuring angle oma, e.g. due to a comparatively low positioning accuracy of the robot 144, the actual (suboptimal) distance and/or relative angular position may be determined, and for the respective values of the actual distance and/or the actual relative angular position corresponding reference measurement information may be retrieved from the database DB, e.g. in the form of first reference measurement information rmi1 and/or second reference measurement information rmi2. Said corresponding reference measurement information so retrieved from said database DB may e.g. be used for determining said FFT of said reference measurement pulse shape in accordance with optional step e) mentioned above.

This way, advantageously, undesired changes of said pulse shape and thus also of an associated transfer function may be avoided, which may result from suboptimal positioning and/or alignment, and which could affect the e.g. layer thickness measurements.

According to further preferred embodiments, undesired changes of the aforementioned type may e.g. be avoided by fine-tuning the distanced and/or relative angular position a1 of the measuring head 130 with respect to the object 10, e.g. using the respective optimum values omd, oma for measurement.

However, according to further preferred embodiments, e.g. if such fine-tuning is not practical (or not technically or economically feasible, e.g., due to an insufficient positioning precision of e.g. the robot 144, as e.g. compared to the drives 140, 142), advantageously, appropriate reference measurement information (rmi1 and/or rmi2) that has been obtained in accordance with the embodiments (cf. e.g. FIG. 6, 7) and that is associated with a current suboptimal measuring distance and/or suboptimal measuring angle a1 may be used for modifying measurement results mr (FIG. 12), e.g. for evaluating layer thickness measurement pulse shape(s). According to further preferred embodiments, in these cases, it is not required to measure reference measurement information, but this reference measurement information may rather be retrieved e.g. from the database DB.

According to further preferred embodiments, it is also possible to extend a specific drive 144 such as a robot 144 (FIG. 11B), which per se does not have a sufficient positioning accuracy for a desired precision regarding THz-based measurements such as layer thickness measurements, by adding at least one drive, especially high-accuracy drive (similar to the drive(s) 140, 142), to enable said fine-tuning of the distance d and/or relative angular position a1 of the measuring head 130 mounted to the robot 144 with respect to the object 10, e.g. using the respective optimum values omd, oma for measurement.

The principle according to the embodiments may advantageously be used for any field of measurement based on THz signals TS and is particularly not limited to applications for layer thickness measurements.

Further preferred embodiments relate to a use of the method according to the embodiments and/or of the measuring device 100 (FIG. 1) according to the embodiments for at least one of the following elements: a) determining a distance d between said measuring head 130 and said object 10 to be measured, b) determining a relative angular position of said measuring head 130 with respect to said object 10 to be measured, c) compensating a suboptimal distanced between said measuring head 130 and said object 10 to be measured by using information from a/the database DB (FIG. 1), said database DB comprising at least a plurality of distance values and first reference measurement information rmi1 associated with said plurality of distance values, wherein said suboptimal distance is preferably characterized by an actual distance between said measuring head and said object to be measured being such that a surface 10a (FIG. 1) of said object 10 to be measured does not comprise a focal point FP of said THz signal TS, d) compensating a suboptimal relative angular position of said measuring head with respect to said object to be measured by using information from a/the database DB, said database DB comprising at least a plurality of relative angular position values and second reference measurement information rmi2 associated with said plurality of relative angular position values, wherein said suboptimal relative angular position of said measuring head 130 with respect to said object 10 to be measured is preferably characterized by a surface normal SN (FIG. 1) of a surface 10a of said object 10 to be measured not being parallel with a reference axis RA of said measuring head 130, e) compensating a suboptimal distance between said measuring head 130 and said object 10 to be measured and a suboptimal relative angular position of said measuring head 130 with respect to said object 10 to be measured by using information from a or said database DB.

Figure 10:
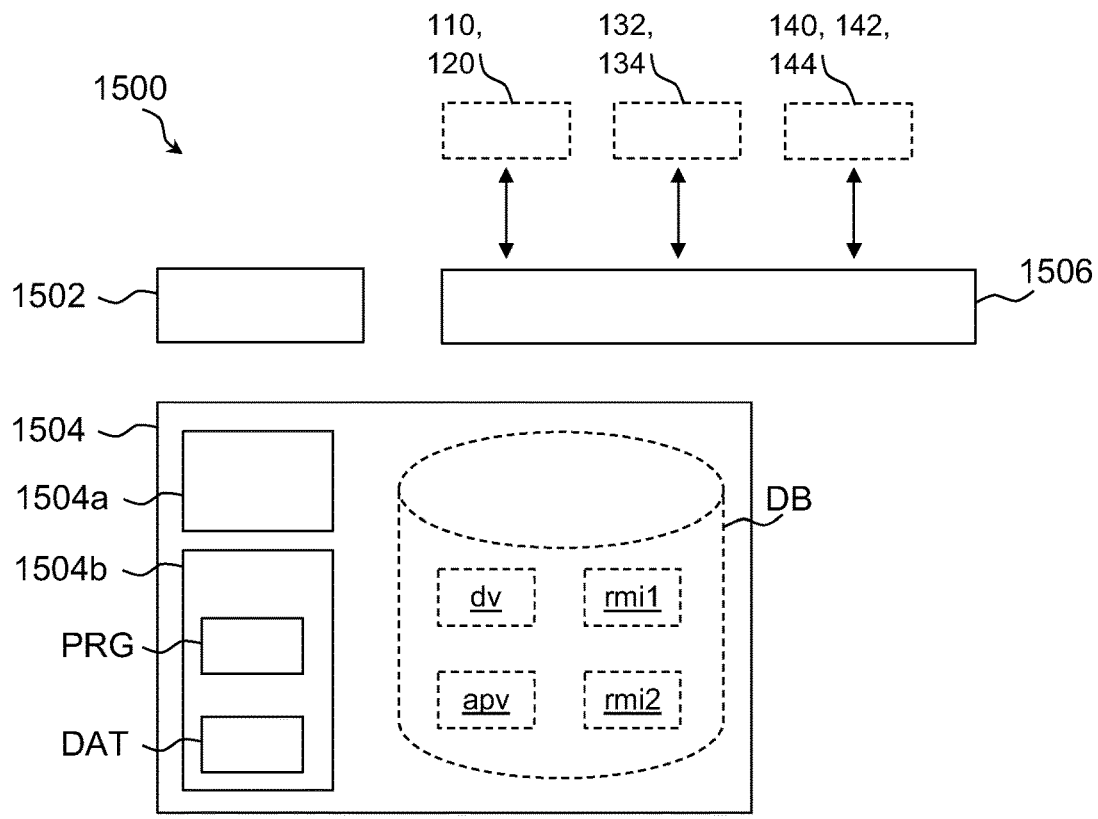

FIG. 10 schematically depicts a simplified block diagram of a control device 1500 according to further preferred embodiments. According to further preferred embodiments, the optional control device 150 of FIG. 1 may comprise a configuration identical or at least similar to the control device 1500 of FIG. 10.

According to further preferred embodiments, the control device 1500 comprises at least one calculating unit 1502, at least one memory unit 1504 associated with (i.e., usable by) the at least one calculating unit 1502 for at least temporarily storing a computer program PRG, wherein said computer program PRG is configured to at least temporarily control an operation of said control device 150, 1500 and/or said measuring device 100 and/or at least one component of and/or associated with said measuring device 100, e.g. 110, 120, 132, 134, 140, 142, 144.

According to further preferred embodiments, the calculating unit 1502 comprises at least one of the following elements: a microprocessor, a microcontroller, a digital signal processor (DSP), a programmable logic element (e.g., FPGA, field programmable gate array), an ASIC (application specific integrated circuit). According to further preferred embodiments, any combination of two or more of these elements is also possible.

According to further preferred embodiments, the memory unit 1504 comprises at least one of the following elements: a volatile memory 1504a, particularly a random-access memory (RAM), a non-volatile memory 1504b, particularly a Flash-EEPROM. Preferably, said computer program PRG is stored in said non-volatile memory 1504b. Further data DAT such as configuration data for the measuring device 100 or at least one of its components may also be stored in said non-volatile memory 1504*b*.

The memory unit 1504 may also at least temporarily store components or parts dv, apv, rmi1, rmi2 of said database DB (or the complete database), as explained above, wherein data of said database DB may e.g. be used to modify and/or evaluate and/or refine measurement results mr and/or to compensate e.g. positioning errors.

According to further preferred embodiments, said control device 1500 may also comprise at least one interface 1506 for exchanging data with the THz transmitter 110 and/or the THz receiver 120 and/or the sensors 132, 134 and/or the drives 140, 142, 144.

Further preferred embodiments relate to a use of the method according to the embodiments and/or of the measuring device 100 according to the embodiments for performing and/or preparing layer thickness measurements 250, particularly of a plurality of layers 11, 12 arranged on a body 10'*b* (FIG. 14), particularly of a) wet paint layers 12 that have not yet dried and/or of b) drying paint layers 12 and/or of c) dry paint layers 11, wherein preferably said measuring device 100 is used A) in a stationary configuration (e.g. as a laboratory system and/or reference and/or calibration system, cf. FIG. 11A) and/or B) in a nonstationary configuration, especially with a robot 144 (FIG. 11B), particularly an industrial robot 144.

According to further embodiments, said robot 144 may be a six axes manipulator configured to carry the measuring head 130 and optionally said sensors 132 (FIG. 1) and/or 134. Alternatively, at least one of said sensors 132, 134 may be integrated in said measuring head 130.

According to further preferred embodiments, said measuring head 130 (FIG. 1) may comprise a laser pointer (not shown) or a similar light emitting device which is configured to visually indicate the position of the focal point FP of said THz signal TS (and/or the orientation of the reference axis RA of the measuring head), preferably in a visible wavelength range of human beings.

According to further preferred embodiments, said measuring head 130 and/or said control device 150 may comprise a data interface 1506 (FIG. 10), e.g. field bus interface, for data exchange with external devices, e.g. to enable an external device (not shown) to at least temporarily control an operation of said measuring head 130 and/or said control device 150.

Figure 15A:
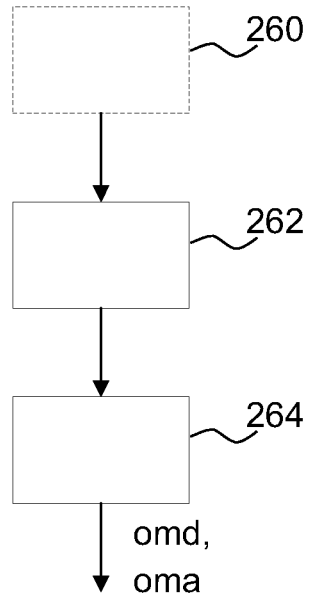
FIGS. 15A to 15C each schematically depict a simplified flow-chart of a method according to further embodiments, FIGS. 16A to 16B each schematically depict a simplified flow-chart of a method according to further preferred embodiments.

In the following, further preferred embodiments and scenarios are explained with reference to FIG. 15A et seq., wherein FIG. 15A schematically depicts a simplified flowchart of an exemplary process, which may e.g. be used for an optimization and/or fine tuning of the distance d (FIG. 1) and/or the relative angular position a1, of the measuring head 130, preferably relative to a reference object 10'*a* (FIG. 11).

In a first, optional, step 260, it is ensured that a pivot point PP (FIG. 1) associated with a rotational movement of said measuring head 130 with respect to the reference object 10'*a* is arranged within a surface region of said reference object 10'*a*, wherein further preferably it is further ensured that a focal point of said THz signal TS is also arranged within said surface region, thus avoiding any distance error that may be caused by a rotational movement with a pivot point PP outside of said surface of the reference object 10'*a* and/or outside of the focal point FP. According to further preferred embodiments, said optional ensuring 260 may e.g. be achieved by a suitable design of the measuring head 130 and/or of a support 10'*a*' (FIG. 11A) for receiving and/or fixation of said reference object 10'*a*.

Returning to FIG. 15A, in a further step 262, an optimum measuring distance omd (also cf. FIG. 4) is determined. According to further preferred embodiments, determining 262 said optimum measuring distance omd may comprise varying the distance d between the measuring head 130 (FIG. 1) and the reference object 10'*a* (FIG. 11A), preferably in a sufficiently large distance range, e.g. similar to step 200 of the process according to FIG. 2 explained above. According to further preferred embodiments, said determining step 262 may also comprise the steps 202, 204, 206 (or at least some repetitions thereof) as explained above with reference to FIG. 2, wherein the first parameter P1 characterizing a detected signal proportional and/or related to said received reflected portion TSR of said THz signal TS e.g. represents a, preferably integral, THz power associated with said received reflected portion TSR of said THz signal TS, wherein preferably said (integral) THz power may be determined in the time domain and/or the frequency domain.

According to further preferred embodiments the, preferably integral, THz power P1 associated with said received reflected portion TSR of said THz signal TS is determined, preferably for each distance value d as obtained by said varying of the distance d. This way, according to further preferred embodiments, e.g. a plurality of value pairs or 2-tuples may be obtained, each value pair or 2-tuple comprising a respective distance value and an associated THz power.

As an example, according to further preferred embodiments, the step 262 may also comprise selecting that value pair of said plurality of value pairs, which comprises the largest value of the THz power P1, wherein the distance value of said selected value pair corresponds with the optimum measuring distance omd.

According to further preferred embodiments, said method, e.g. step 262, further comprises determining said distance, preferably by means of at least one distance sensor 132 (FIG. 1), e.g. a triangulation sensor, and/or a three-dimensional (3D-) scanner, e.g. capable of detecting a surface shape and/or surface position and/or surface orientation.

In a further step 264 of FIG. 15A, an optimum measuring angle oma (also cf. FIG. 5) is determined. According to further preferred embodiments, determining 264 said optimum measuring angle oma may comprise varying the relative angular position a1 between the measuring head 130 (FIG. 1) and the reference object 10'*a* (FIG. 11A), preferably in a sufficiently large (one- or two-dimensional) angular range, e.g. similar to step 210 of the process according to FIG. 3 explained above. According to further preferred embodiments, said determining step 264 (FIG. 15A) may also comprise the steps 212, 214, 216 (or at least some repetitions thereof) as explained above with reference to FIG. 3, wherein the second parameter P2 characterizing a detected signal proportional and/or related to said received reflected portion TSR of said THz signal TS e.g. represents a, preferably integral, THz power associated with said received reflected portion TSR of said THz signal TS, wherein preferably said (integral) THz power may be determined in the time domain and/or the frequency domain.

According to further preferred embodiments the, preferably integral, THz power P2 associated with said received reflected portion TSR of said THz signal TS is determined, preferably for each angular position value a1 as obtained by said varying of the relative angular position a1. This way, according to further preferred embodiments, e.g. a plurality of value "pairs" or 2(3)-tuples may be obtained, each value "pair" or 2(3)-tuple comprising at least one respective angular position value and an associated THz power. As an example, if said relative angular position a1 is varied within a two-dimensional angular range, e.g. 3-tuples are obtained comprising a first angular position value associated with a first angular dimension, a second angular position value associated with a second angular dimension, and a respective THz power P2 associated therewith.

As an example, according to further preferred embodiments, the step 264 (FIG. 15A) may also comprise selecting that value "pair" or tuple, respectively, of said plurality of value "pairs" or tuples, which comprises the largest value of the THz power P2, wherein the corresponding relative angular position value(s) of said selected tuple correspond(s) with the optimum measuring angle oma.

According to further preferred embodiments, said method, e.g. step 264, further comprises determining said relative angular position(s) a1, preferably by means of at least one angular position sensor 134 (FIG. 1), e.g. an optical angular position sensor, preferably a 3D-scanner, e.g. capable of detecting a surface shape and/or surface position and/or surface orientation.

As a result, after step 264, both the optimum measuring distance omd and the optimum measuring angle oma for the apparatus 100 with respect to the reference object 10'a is obtained and may, according to further preferred embodiments, e.g. be used for a further operation of the apparatus 100.

Figure 15B:
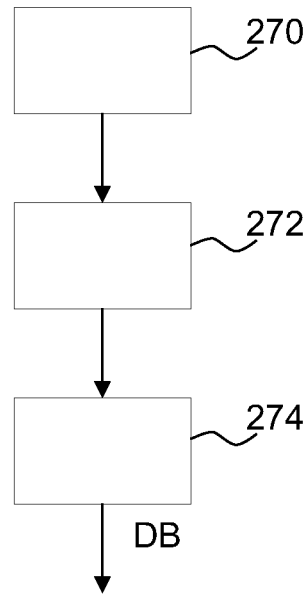

FIG. 15B schematically depicts a simplified flow-chart of an exemplary process, which may e.g. be used for building a/the database DB (FIG. 10), or for adding further data to the database DB, respectively. As an example, the first step 270 comprises varying the distanced between the measuring head 130 (FIG. 1) and the reference object 10'a (FIG. 11A), preferably in a sufficiently large distance range, e.g. similar to step 200 of the process according to FIG. 2 explained above.

A further step 272 comprises, preferably for each distance value as set in the course of varying 270 said distanced, varying the relative angular position a1 between the measuring head 130 (FIG. 1) and the reference object 10'a (FIG. 11A), preferably in a sufficiently large (one- or, preferably, two-dimensional) angular range, e.g. similar to step 210 of the process according to FIG. 3 explained above. When varying the relative angular position a1 along two, preferably orthogonal, angular dimensions, according to further preferred embodiments, said varying 272 may comprise an arbitrary sequence of varying the relative angular position along a first angular dimension and/or along a second angular dimension.

A further step 274 comprises, preferably for each combination of distance value as varied according to step 270 and relative angular position value (one- or, preferably, two-dimensional), performing a reference measurement RM e.g. characterizing a received reflected portion TSR of said THz signal TS associated with said combination. As an example, a data set characterizing a specific reference measurement RM1 at a specific distance d1 and at a specific relative angular position a1, a2 may comprise the following form: (d1, a1, a2, RM1). According to further preferred embodiments, the reference measurements RM and/or data sets, respectively, may be stored in said database DB.

According to further preferred embodiments, distance values and/or relative angular position values as used within step 274 may be determined by measurement, e.g. using one at least one distance sensor 132 (FIG. 1), e.g. a triangulation sensor, and/or a three-dimensional (3D-) scanner, e.g. capable of detecting a surface shape and/or surface position and/or surface orientation, and/or at least one angular position sensor 134 (FIG. 1), e.g. an optical angular position sensor, preferably a 3D-scanner, e.g. capable of detecting a surface shape and/or surface position and/or surface orientation.

According to further preferred embodiments, both distance values dv (also cf. FIG. 10) and/or relative angular position values apv as used within step 274 (FIG. 15B) may be determined using a 3D-scanner 134.

According to further preferred embodiments, distance values dv and/or relative angular position values apv as used within step 274 may be determined from control signals used for controlling one or more of said drive(s) 140, 142 for effecting the variation of distanced and/or relative angular position.

Figure 15C:
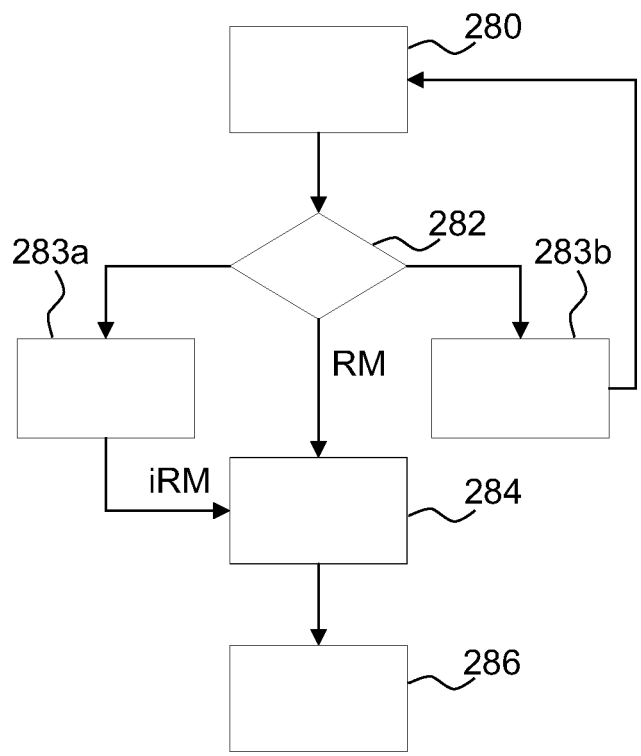

FIG. 15C schematically depicts a simplified flow-chart of an exemplary process, which may e.g. be used for measuring an object, e.g. a sample 10'b (FIG. 11B). According to further preferred embodiments, it is assumed that, prior to a first step 280, the measuring head 130 is positioned relative to the sample 10'b.

In the first step 280, a distance d between the measuring head 130 and the sample 10'b is determined, and a relative angular position (preferably along two angular dimensions) between the measuring head 130 and the sample 10'b is determined. Preferably, the distance and/or the relative angular position is determined by means of a 3D-scanner 134. Alternatively or additionally the distance and/or the relative angular position may be determined using at least one other type of distance sensor 132 and/or angular position sensor 134.

In step 282, it is determined whether said database DB comprises a dataset, i.e. a reference measurement RM for the distance and/or the relative angular position as determined in step 280 (said reference measurement e.g. comprising a tuple of distance value and/or angular position value and/or reference measurement information such as e.g. at least one measured THz signal measured for said distance value and/or angular position value). If so, i.e. if there is a reference measurement RM stored in the database DB (e.g., from a previous measurement process, cf. e.g. step 274 of FIG. 15B), the stored reference measurement RM may be used for further processing. If not, i.e. if the database DB does not (yet) comprise a reference measurement RM for the distance and/or the relative angular position as determined in step 280, either step 283a or step 283b is executed. Step 283a comprises interpolating between existing reference measurements for (e.g., preferably slightly) different combinations of distance and/or angular positions, wherein an interpolated reference measurement iRM is obtained. According to further preferred embodiments, step 283a may e.g. be executed if the measured values for the distance and/or the relative angular position as determined in step 280 are within a range covered by the reference measurements of the database DB. Otherwise, i.e. if the measured values for the distance and/or the relative angular position as determined in step 280 are not within a range covered by the reference measurements of the database DB, step 283b is executed after step 282, wherein step 283b comprises repositioning the measuring head 130 relative to the sample 10'b. According to further preferred embodiments, after repositioning 283b, steps 280, 282 may be repeated.

According to further preferred embodiments, step 284 may comprise performing one or more layer thickness measurements, similar to step 250 of FIG. 13. In step 286, the stored reference measurement RM (as e.g. retrieved from the database DB, optionally also in step 282) or the interpolated reference measurement iRM as obtained by step 283*a* may be used to compensate and/or correct distance errors (e.g., nonzero deviation from the optimum measuring distance omd) and/or relative angular position errors (e.g., nonzero deviation from the optimum measuring angle oma) that may be present while performing said one or more layer thickness measurements of step 284. According to further preferred embodiments, steps 284, 286 may also be combined. According to further preferred embodiments, particularly, in view of the (interpolated) reference measurement(s) (i)RM, it is not necessary to perform a repositioning for performing said steps 284 and/or 286, e.g. if, for said measurements 284 the optimum measuring distance omd and/or the optimum measuring angle oma is not currently set, because the (interpolated) reference measurement(s) (i)RM enable to at least partly compensate and/or correct distance errors and/or angular errors.

Figure 16A:
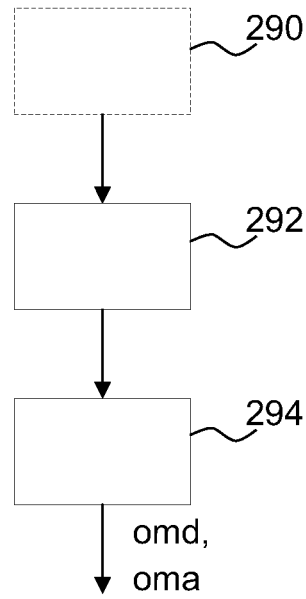

FIG. 16A schematically depicts a simplified flow-chart of an exemplary process, which may e.g. be used for measuring an object, e.g. a sample 10'*b* (FIG. 11B), wherein a third drive 144 such as e.g. a robot 144 (FIG. 11B) may—at least temporarily—be used for effecting a relative movement (translation and/or rotation) of the measuring head 130 with respect to said sample 10'*b*. According to further preferred embodiments, the third drive 144 may comprise a robot 144, e.g. a six-axis (industrial) robot 144, to which said measuring head 130 is attached. According to further preferred embodiments, at least one distance sensor 132 and/or at least one angular position sensor 134 is also provided at said robot 144 to enable distance and/or angular position measurements.

According to further preferred embodiments, additionally to said robot 144, at least one other drive, e.g. one or more of said, preferably high precision, drive(s) 140, 142 (FIG. 1), may at least temporarily be used for effecting a relative movement (translation and/or rotation) of the measuring head 130 with respect to said sample 10'*b* (and/or vice versa). According to further preferred embodiments, and without loss of generality, for the present example it is assumed that said first drive 140 is configured to effect a translatory relative movement between said measuring head 130 and said sample 10'*b*, e.g. to alter the distance d, preferably with a greater precision than the positioning precision of said robot 144, and that said second drive 142 is configured to effect a rotational relative movement between said measuring head 130 and said sample 10'*b*, e.g. to alter the relative angular position(s) (preferably along two angular dimensions), preferably with a greater precision than the positioning precision of said robot 144.

According to further preferred embodiments, one or more of said (preferably high precision) drive(s) 140, 142 may be provided, e.g. in the form of a (preferably at least quasi-stationary) reference and/or calibration arrangement, which may be configured to at least temporarily receive said sample 10'*b* and/or another object 10 to be measured, and to—at least temporarily—move said sample 10'*b* in translatory and/or rotational movement with respect to the robot 144 and the measuring head 130 attached to the robot 144. In other words, said one or more high precision drive(s) 140, 142 are configured to at least temporarily alter the (relative) distance d and/or the relative angular position between the measuring head 130 and the sample 10'*b*, preferably with a higher precision as compared to the robot 144. According to further preferred embodiments, said support 10'*a'* of FIG. 11A may comprise said reference and/or calibration arrangement and/or at least one of said (preferably high precision) drives 140, 142.

In a first, optional, step 290, cf. FIG. 16A, it is ensured that a pivot point PP (e.g., of the second drive 142, cf. FIG. 1) associated with a rotational movement of said measuring head 130 with respect to the sample 10'*b* is arranged within a surface region of said sample 10'*b*, wherein further preferably it is further ensured that a focal point of said THz signal TS is also arranged within said surface region, thus avoiding any distance error that may be caused by a rotational movement with a pivot point PP outside of said surface of the sample 10'*b*. According to further preferred embodiments, said optional ensuring 290 may e.g. be achieved by a suitable design of a mount (not shown) of the reference and/or calibration arrangement 10'*a'* and/or of at least one of said (preferably high precision) drives 140, 142 for receiving and/or fixation of said sample 10'*b*.

According to further preferred embodiments, preferably also in step 290, it is ensured that a pivot point of the robot 144 lies within the focal point FP (FIG. 1) of the THz signal TS of the measuring head 130. According to further preferred embodiments, a point of origin of a coordinate system for the robot's 144 movements may be set to said focal point FP, too. According to further preferred embodiments, the measuring head 130 is moved by the robot 144 to a nominal position close to the reference and/or calibration arrangement 10'*a'* and/or the sample 10'*b* arranged thereon. According to further preferred embodiments, a z-axis (translational) movement for said optional step 290 may at least temporarily be affected by the first drive 140. As an example, said (translational) movement along the z-axis may be used to alter the distance d. Preferably, the optical axis RA of the measuring head 130 is perpendicular to the surface of the sample 10'*b*, e.g. parallel to said z-axis.

In a further step 292, an optimum measuring distance omd is determined, similar to step 262 of FIG. 15A. According to further preferred embodiments, determining 292 said optimum measuring distance omd may comprise (preferably repeatedly) varying the distance d between the measuring head 130 (FIG. 1) and the sample 10'*b* (FIG. 11B), preferably in a sufficiently large distance range, e.g. similar to step 200 of the process according to FIG. 2 explained above. According to further preferred embodiments, varying the distance d is performed by means of said first drive 140. This way, the optimum measuring distance omd may be determined particularly precisely, especially usually more precisely as compared to using the robot 144 for varying the distance d, as the positioning precision of the robot 144 is usually not as high as the positioning precision of the first drive 140.

According to further preferred embodiments, said method, e.g. step 292, further comprises determining said distance d, preferably by means of said at least one distance sensor 132 (FIG. 1), e.g. a triangulation sensor, and/or a three-dimensional (3D-) scanner, e.g. capable of detecting a surface shape and/or surface position and/or surface orientation.

In a further step 294 of FIG. 16A, an optimum measuring angle oma (also cf. FIG. 5) is determined, similar to step 264 of FIG. 15A. According to further preferred embodiments, determining 264 said optimum measuring angle oma may comprise varying the relative angular position a1 between the measuring head 130 (FIG. 1) and the sample 10'*b* (FIG. 11B), preferably in a sufficiently large (one- or, preferably, two-dimensional) angular range, e.g. similar to step 210 of the process according to FIG. 3 explained above. According to further preferred embodiments, varying the relative angular position is performed by means of said second drive 142. This way, the optimum measuring angle oma may be determined particularly precisely, especially usually more precisely as compared to using the robot 144 for varying the angular position, as the (angular) positioning precision of the robot 144 is usually not as high as the positioning precision of the second drive 142.

According to further preferred embodiments, said method, e.g. step 294, further comprises determining said relative angular position(s) a1, preferably by means of at least one angular position sensor 134 (FIG. 1), e.g. an optical angular position sensor, preferably a 3D-scanner, e.g. capable of detecting a surface shape and/or surface position and/or surface orientation.

As a result, after step 294, both the optimum measuring distance omd and the optimum measuring angle oma for the measuring head 130 with respect to the sample 10'b is obtained and may, according to further preferred embodiments, e.g. be used for further measurement(s).

According to further preferred embodiments, the process explained above with reference to FIG. 16A may be used for optimizing an adjustment of the measuring head 130, especially when attached to a robot 144, with respect to the sample 10'b, thus characterizing a first sequence.

Figure 16B:
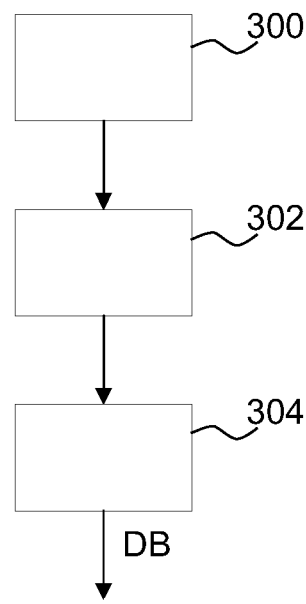

FIG. 16B schematically depicts a simplified flow-chart of an exemplary process, which may e.g. be used for building a/the database DB (FIG. 10), or for adding further data to the database DB, respectively, and which may characterize a second sequence e.g. usable with/after the first sequence according to FIG. 16A explained above. As an example, the first step 300 comprises, similar to step 270 of FIG. 15B, varying the distanced between the measuring head 130 (FIG. 1) and the sample 10'b (FIG. 11B), preferably in a sufficiently large distance range, e.g. similar to step 200 of the process according to FIG. 2 explained above. According to further preferred embodiments, varying the distance d is performed by means of said first drive 140.

A further step 302 comprises, similar to step 272 of FIG. 15B, preferably for each distance value as set in the course of varying 300 said distance d, varying the relative angular position a1 between the measuring head 130 (FIG. 1) and the sample 10'b, preferably in a sufficiently large (one- or, preferably, two-dimensional) angular range, e.g. similar to step 210 of the process according to FIG. 3 explained above. According to further preferred embodiments, varying the relative angular position is performed by means of said second drive 142. When varying the relative angular position a1 along two, preferably orthogonal, angular dimensions, according to further preferred embodiments, said varying 302 may comprise an arbitrary sequence of varying the relative angular position along a first angular dimension and/or along a second angular dimension.

A further step 304 (FIG. 16B) comprises, similar to step 274 of FIG. 15B, preferably for each combination of distance value as varied according to step 300 and relative angular position value (one- or, preferably, two-dimensional), performing a reference measurement RM e.g. characterizing a received reflected portion TSR of said THz signal TS associated with said combination. As an example, and as already explained above with reference to FIG. 15B, a data set characterizing a specific reference measurement RM1 at a specific distance d1 and at a specific relative angular position a1, a2 may comprise the following form: (d1, a1, a2, RM1). According to further preferred embodiments, the reference measurements RM and/or data sets, respectively, may be stored in said database DB.

According to further preferred embodiments, distance values and/or relative angular position values as used within step 304 may be determined by measurement, e.g. using one at least one distance sensor 132 (FIG. 1), e.g. a triangulation sensor, and/or a three-dimensional (3D-) scanner, e.g. capable of detecting a surface shape and/or surface position and/or surface orientation, and/or at least one angular position sensor 134 (FIG. 1), e.g. an optical angular position sensor, preferably a 3D-scanner, e.g. capable of detecting a surface shape and/or surface position and/or surface orientation.

According to further preferred embodiments, both distance values and/or relative angular position values as used within step 304 may be determined using a 3D-scanner 134.

According to further preferred embodiments, distance values and/or relative angular position values as used within step 304 may be determined from control signals used for controlling one or more of said drive(s) 140, 142 for effecting the variation of distanced and/or relative angular position.

Based on the database DB as e.g. obtained by the process explained above with reference to FIG. 16B, one or more layer thickness measurements may be performed for said sample 10'b (and/or for further samples), which layer thickness measurements may, according to further preferred embodiments, be characterized as a third sequence. For performing said layer thickness measurements, the process as explained above with reference to FIG. 15C may be performed, wherein the reference and/or calibration arrangement as explained above with reference to FIGS. 16A, 16B is not necessarily required. Rather, according to further preferred embodiments, said layer thickness measurements may be performed by positioning, by means of the robot 144, the measuring head 130 relative to a sample 10'b, e.g. an automotive body part or the like. Advantageously, layer thickness measurements or respective THz signals so obtained may be processed, i.e. evaluated based on the database DB as obtained according to FIG. 16B, whereby distance and/or angular positioning errors due to robot 144 (i.e., deviations from the optimal values omd and/or oma) may advantageously be compensated using the reference measurements (or interpolated values derived therefrom) from the database DB. This way, according to further preferred embodiments, particularly a potentially lengthy and/or costly repositioning of the measuring head 130 by means of the robot 144 may be avoided, so that the process according to preferred embodiments is particularly suited for application in industrial manufacturing environments, e.g. for in-line THz-radiation based layer thickness measurements, where said robot 144 with the measuring head 130 is positioned within a manufacturing line.

The invention claimed is:

1. A method of operating a measuring device comprising a Terahertz, THz, transmitter configured to emit a THz signal (TS) to a reference object to be measured and a THz receiver configured to receive a reflected portion (TSR) of said THz signal (TS) that has been reflected by said reference object, wherein said THz transmitter and said THz receiver are arranged in a measuring head of said measuring device, said method comprising:
   A) varying a distance (d) between said measuring head and said reference object to be measured, having a known geometry, emitting, by said THz transmitter, said THz signal (TS) to said reference object to be measured, receiving said reflected portion (TSR) of said THz signal (TS), and determining a first parameter characterizing a detected signal proportional and/or related to said received reflected portion (TSR) of said THz signal (TS), further including:

for a plurality of distance values (dv) of said distance (d) between said measuring head and said reference object to be measured, wherein the plurality of distance values (dv) are within a predetermined first range: determining and storing in at least one database said plurality of distance values (dv), determining and storing in the at least one database first reference measurement information (rmi1) characterizing a received reflected portion (TSR) of said THz signal (TS) associated with said plurality of distance values (dv); and B) varying a relative angular position of said measuring head with respect to said reference object to be measured, emitting, by said THz transmitter, said THz signal (TS) to said reference object to be measured, receiving said reflected portion (TSR) of said THz signal (TS), determining a second parameter characterizing a detected signal proportional or related to said received reflected portion (TSR) of said THz signal (TS), further including:

for a plurality of relative angular position values of a relative angular position between said measuring head and said reference object to be measured, wherein said plurality of relative angular position values (apv) are of a predetermined second range: determining and storing in the at least one database said plurality of relative angular position values (apv), determining and storing in the at least one database second reference measurement information (rmi2) characterizing a received reflected portion (TSR) of said THz signal (TS) associated with said plurality of relative angular position values (apv);

performing measurements of a sample object to be measured that is different from the reference object and that is not positioned at an optimum measuring distance (omd) and/or an optimum measuring angle (oma) and obtaining measurement results (mr); and modifying said measurement results (mr) of the sample object to be measured by using said plurality of distance values and said first reference measurement information (rmi1) stored in the at least one database, and said plurality of relative angular position values (apv) and said second reference measurement information (rmi2) stored in the at least one database.

2. The method according to claim 1, wherein said distance (d) is varied within the predetermined first range, said method further comprising:

repeating said steps of varying a distance (d) between said measuring head and said reference object to be measured, emitting, by said THz transmitter, said THz signal (TS) to said reference object to be measured, receiving said reflected portion (TSR) of said THz signal (TS), and determining said first parameter (P1) characterizing said detected signal proportional or related to said received reflected portion (TSR) of said THz signal (TS), until said first parameter (P1) exceeds a predetermined first threshold (T1) or reaches a maximum with respect to said predetermined first range, wherein a value of said distance (d) which is associated with said maximum of said first parameter (P1) represents said optimum measuring distance (omd), wherein said optimum measuring distance (omd) is at least temporarily stored.

3. The method according to claim 1, wherein said step of varying said relative angular position comprises one or more of:

varying said relative angular position in at least more than one spatial direction; or varying said relative angular position in two spatial directions orthogonal to each other.

4. The method according to claim 1, wherein said relative angular position is varied within the predetermined second range, said method further comprising:

repeating said steps of varying said relative angular position, emitting, by means of said THz transmitter, said THz signal (TS) to said object to be measured, receiving said reflected portion (TSR) of said THz signal (TS), determining said second parameter (P2) characterizing said detected signal proportional or related to said received reflected portion (TSR) of said THz signal (TS), until said second parameter (P2) exceeds a predetermined second threshold (T2) or reaches a maximum with respect to said predetermined second range, wherein preferably a value of said relative angular position (a1) which is associated with said maximum of said second parameter (P2) represents an optimum measuring angle (oma), wherein preferably said optimum measuring angle (oma) is at least temporarily stored.

5. The method according to claim 1, wherein said step of determining said first parameter or said step of determining said second parameter or said step of determining and storing first reference measurement information or said step of determining and storing second reference measurement information comprises applying a filtering process to said received reflected portion (TSR) of said THz signal (TS).

6. The method according to claim 1, further comprising: determining said distance (d) using at least one distance sensor, wherein the at least one distance sensor includes a triangulation sensor; and/or b) determining said relative angular position using at least one angular position sensor, wherein the at least one angular position sensor includes an optical sensor.

7. The method according to claim 1, wherein said step of varying said distance (d) between said measuring head and said reference object to be measured comprises one or more of:

moving, in a translatory movement, by a first drive, said measuring head with respect to said reference object to be measured; or moving, in a translatory movement, by a second drive, said reference object to be measured with respect to said measuring head.

8. The method according to claim 1, wherein said step of varying said relative angular position of said measuring head with respect to said reference object to be measured comprises one or more of:

rotating, by a first drive, said measuring head with respect to said reference object to be measured; or rotating, by a second drive, said reference object to be measured with respect to said measuring head, wherein a pivot point (PP) associated with said rotation is arranged within a surface region of said reference object to be measured, wherein a focal point (FP) of said THz signal (TS) is also arranged within said surface region.

9. The method according to claim 2, further comprising: determining the optimum measuring distance (omd).

10. The method according to claim 4, further comprising: determining the optimum measuring angle (oma).

11. The method according to claim 1, further comprising: building a database (DB) comprising a plurality of distance values (dv) and/or a plurality of relative angular position values (apv) and first reference measurement information (rmi1) associated with said plurality of distance values (dv) or second reference measurement information (rmi2) associated with said plurality of relative angular position values (apv).

12. The method according to claim 11, said method further comprising:
performing layer thickness measurements of the sample object to be measured using said THz signal (TS) to obtain measurement results (mr); and
modifying said measurement results (mr) depending on information from said database (DB), whereby modified measurement results (mr') are obtained.

13. The method according to claim 1, wherein for said step of performing further measurements, a third drive is used for positioning the measuring head relative to said sample object to be measured, wherein said third drive is different from a first drive or a second drive.

14. A method of operating a measuring device comprising a Terahertz, THz, transmitter configured to emit a THz signal (TS) to a reference object to be measured and a THz receiver configured to receive a reflected portion (TSR) of said THz signal (TS) that has been reflected by said reference object, wherein said THz transmitter and said THz receiver are arranged in a measuring head of said measuring device, said method comprising:
A) varying a distance (d) between said measuring head and said reference object to be measured, having a known geometry, emitting, by said THz transmitter, said THz signal (TS) to said reference object to be measured, receiving said reflected portion (TSR) of said THz signal (TS), and determining a first parameter characterizing a detected signal proportional and/or related to said received reflected portion (TSR) of said THz signal (TS), further including:
for a plurality of distance values (dv) of said distance (d) between said measuring head and said reference object to be measured, wherein the plurality of distance values (dv) are within a predetermined first range: determining and storing said plurality of distance values (dv), determining and storing first reference measurement information characterizing a received reflected portion (TSR) of said THz signal (TS) associated with said plurality of distance values (dv); and
B) varying a relative angular position of said measuring head with respect to said reference object to be measured, emitting, by said THz transmitter, said THz signal (TS) to said reference object to be measured, receiving said reflected portion (TSR) of said THz signal (TS), determining a second parameter characterizing a detected signal proportional or related to said received reflected portion (TSR) of said THz signal (TS), further including:
for a plurality of relative angular position values of a relative angular position between said measuring head and said reference object to be measured, wherein said plurality of relative angular position values (apv) are of a predetermined second range: determining and storing said plurality of relative angular position values (apv), determining and storing second reference measurement information characterizing a received reflected portion (TSR) of said THz signal (TS) associated with said plurality of relative angular position value;
determining a distance (d) between the measuring head and a sample and a relative angular position (a1), along two angular dimensions, between the measuring head and the sample, wherein the distance (d) or the relative angular position (a1) is determined by means of a 3D-scanner;
determining whether a database (DB) comprises a dataset characterizing a reference measurement (RM) for the determined distance (d) or the determined relative angular position (a1); and
when said database (DB) comprises a dataset characterizing a reference measurement (RM) for the determined distance (d) or the determined relative angular position (a1), using said reference measurement (RM) for further processing, including correcting distance errors or relative angular position errors, for at least one future layer thickness measurement; and
when said database (DB) does not comprise a reference measurement (RM) for the determined distance (d) or the determined relative angular position (a1), said method further comprises:
a) interpolating between existing reference measurements for different combinations of distance or angular positions, wherein an interpolated reference measurement (iRM) is obtained, wherein said interpolating is performed if the determined values for the distance (d) or the relative angular position (a1) are within a range covered by the reference measurements (RM) of the database (DB); or
b) if the measured values for the determined distance or the determined relative angular position are not within the range covered by the reference measurements (RM) of the database (DB), repositioning the measuring head relative to the sample and after said repositioning, repeating the steps of determining a distance (d) between the measuring head and the sample and a relative angular position (a1) and determining whether said database (DB) comprises a dataset characterizing a reference measurement (RM) for the determined distance (d) and/or the determined relative angular position (a1), wherein the method further comprises performing one or more layer thickness measurements or using the stored reference measurement (RM) or the interpolated reference measurement (iRM) to compensate or correct distance errors or relative angular position errors that may be present while performing said one or more layer thickness measurements.

15. The method according to claim 14, wherein said method comprises:
determining a layer thickness of a plurality of layers arranged on the sample, wherein the plurality of layers may include one or more of the following: a) a plurality of wet paint layers that have not yet dried; b) a plurality of drying paint layers; or c) a plurality of dry paint layers.

16. A measuring device, comprising:
a Terahertz (THz) transmitter configured to emit a THz signal (TS) to a sample object to be measured; and
a THz receiver configured to receive a reflected portion (TSR) of said THz signal (TS) that has been reflected by said sample object, and a control device, wherein said THz transmitter and said THz receiver are arranged in a measuring head of said measuring device, said measuring device being configured to:
perform measurements of the sample object and obtain measurement results (mr), wherein the sample object is not positioned at an optimum measuring distance (omd) and/or an optimum measuring angle (oma); and determine a distance (d) between the measuring head and the sample object and a relative angular position (a1), along two angular dimensions, between the measuring head and the sample object, wherein the distance (d) or the relative angular position (a1) is determined using a 3D-scanner;

access at least one database (DB) and determine whether the at least one database (DB) comprises a dataset characterizing a reference measurement (RM) for the determined distance (d) or the determined relative angular position (a1), wherein the reference measurement was obtained using a reference object with a known geometry; and when said at least one database (DB) comprises the dataset characterizing the reference measurement (RM) for the determined distance (d) or the determined relative angular position (a1), using the reference measurement (RM) to modify the measurement results (mr) of the sample object, wherein modifying the measurement results (mr) of the sample object includes correcting distance errors or relative angular position errors, to obtain at least one layer thickness measurement.

17. The measuring device according to claim 16, wherein the measuring device is configured to perform layer thickness measurements of a plurality of layers arranged on the sample object, wherein the plurality of layers may include one or more of the following: a) a plurality of wet paint layers that have not yet dried; or b) a plurality of drying paint layers; or c) a plurality of dry paint layers.

18. The measuring device according to claim 17, wherein the measuring device is configured in at least one of: a stationary configuration or in a nonstationary configuration; and wherein the measuring device is implemented with an industrial robot.

* * * * *